United States Patent
Zhang et al.

(10) Patent No.: US 10,536,457 B2
(45) Date of Patent: Jan. 14, 2020

(54) USER DATA PROCESSING APPARATUS AND METHOD, AND SYSTEM

(71) Applicant: HUAWEI TECHNOLOGIES CO., LTD., Shenzhen, Guangdong (CN)

(72) Inventors: Jin Zhang, Shanghai (CN); Han Zhou, Shanghai (CN); Zhongping Chen, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/908,141

(22) Filed: Feb. 28, 2018

(65) Prior Publication Data
US 2018/0205732 A1    Jul. 19, 2018

Related U.S. Application Data

(63) Continuation of application No. PCT/CN2015/088435, filed on Aug. 28, 2015.

(51) Int. Cl.
*H04L 29/06* (2006.01)
*H04W 76/12* (2018.01)
*H04L 29/12* (2006.01)

(52) U.S. Cl.
CPC ........ *H04L 63/0876* (2013.01); *H04L 61/106* (2013.01); *H04L 63/102* (2013.01); *H04W 76/12* (2018.02)

(58) Field of Classification Search
CPC ....... H04L 29/06; H04L 29/12; H04L 63/102; H04W 76/12
See application file for complete search history.

(56) References Cited

U.S. PATENT DOCUMENTS

| | | | |
|---|---|---|---|
| 2009/0245256 A1 | 10/2009 | Yan et al. | |
| 2012/0108207 A1 | 5/2012 | Schell et al. | |
| 2013/0142046 A1* | 6/2013 | Zhou | H04W 28/24 370/230 |
| 2013/0294409 A1 | 11/2013 | Shuai et al. | |
| 2014/0003433 A1* | 1/2014 | Narayanaswamy | H04L 49/355 370/392 |

(Continued)

FOREIGN PATENT DOCUMENTS

| CN | 101431780 A | 5/2009 |
|---|---|---|
| CN | 103731929 A | 4/2014 |

(Continued)

OTHER PUBLICATIONS

International Search Report, dated May 27, 2016, in International Application No. PCT/CN2015/088435 (4 pp.).

(Continued)

*Primary Examiner* — Chi Ho A Lee
(74) *Attorney, Agent, or Firm* — Leydig, Voit & Mayer, Ltd.

(57) ABSTRACT

The present disclosure relates to a user data processing apparatus and method, and a system. In the user data processing apparatus disclosure, an interface management unit receives user data; at least two service units process the user data, where the at least two service units include a session unit and at least one of a bearer unit, a service flow unit, or a content unit; the interface management unit determines the session unit configured to process the user data, and sends the received user data to the determined session unit; and the session unit determines another service unit configured to process the user data. After receiving the user data, the GW-U determines the service unit configured to process the user data, and processes the user data by using the service unit determined by the GW-U. This improves processing flexibility of the GW-U.

20 Claims, 18 Drawing Sheets

(56) References Cited

U.S. PATENT DOCUMENTS

| | | | |
|---|---|---|---|
| 2014/0160936 A1* | 6/2014 | Liu | H04L 47/2408 370/235 |
| 2014/0198718 A1* | 7/2014 | Billau | H04W 40/02 370/328 |
| 2014/0219093 A1* | 8/2014 | Damola | H04L 47/805 370/235 |
| 2015/0055623 A1* | 2/2015 | Li | H04W 40/04 370/331 |
| 2015/0110095 A1 | 4/2015 | Tan et al. | |
| 2015/0139085 A1* | 5/2015 | Kaczmarska-Wojtania | H04L 5/0053 370/329 |
| 2015/0146539 A1* | 5/2015 | Mehta | H04L 45/22 370/237 |
| 2015/0249570 A1 | 9/2015 | Zhang et al. | |
| 2016/0285977 A1* | 9/2016 | Ng | H04L 12/4625 |
| 2017/0195431 A1* | 7/2017 | Tamura | H04W 76/12 |
| 2017/0231020 A1* | 8/2017 | Tomici | H04L 63/0892 |

FOREIGN PATENT DOCUMENTS

| | | |
|---|---|---|
| EP | 2843885 A1 | 3/2015 |
| EP | 2 861 038 A1 | 4/2015 |
| EP | 2854475 A1 | 4/2015 |
| EP | 3 010 278 A1 | 4/2016 |
| EP | 3 086 513 A1 | 10/2016 |
| JP | 2015050772 A | 3/2015 |
| RU | 2417554 C1 | 4/2011 |
| RU | 2507710 C2 | 2/2014 |
| WO | 2014/000286 A1 | 1/2014 |
| WO | 2014/075315 | 5/2014 |
| WO | 2014/199646 A1 | 12/2014 |
| WO | 2015/096005 A1 | 7/2015 |

OTHER PUBLICATIONS

Official Action, dated Dec. 10, 2018, in Russian Application No. 2018110606 (10 pp.).

International Search Report dated May 27, 2016, in corresponding International Patent Application No. PCT/CN2015/088435, 4 pgs.

Extended European Search Report dated Mar. 28, 2018, in corresponding European Patent Application No. 15902513.9, 13 pgs.

Notice of Reasons for Rejection, dated Mar. 5, 2019, in Japanese Application No. 2018506552 (7 pp.).

Office Action, dated May 8, 2019, in Chinese Application No. 201580023458.1 (13 pp.).

* cited by examiner

USER DATA PROCESSING APPARATUS AND METHOD, AND SYSTEM

CROSS-REFERENCE TO RELATED APPLICATIONS

This application is a continuation of International Application No. PCT/CN2015/088435, filed on Aug. 28, 2015, the disclosure of which is hereby incorporated by reference in its entirety.

TECHNICAL FIELD

The present disclosure relates to the field of communications technologies, and in particular, to a user data processing apparatus and method, and a system.

BACKGROUND

As shown in FIG. 1, in a wireless communications system, a serving general packet radio service support node (Serving GPRS Supporting Node, SGSN) in a core network (CN) is configured to implement functions such as routing and forwarding, mobility management, session management, and user information storage in a general packet radio service (GPRS) or Universal Mobile Telecommunications System (UMTS) network. A gateway general packet radio service support node (GGSN) is configured to connect to an external packet data network (PDN).

In a network architecture shown in FIG. 1, user equipment (UE) initiates an attach requesting procedure by using a universal terrestrial radio access network (UTRAN) or a GSM/EDGE radio access network (GERAN). After completing UE authentication according to user subscription data and authentication data that are obtained from a home location register (HLR), the SGSN notifies the UE that attach is allowed.

When the UE needs to use a user service, the UE sends a request to the SGSN to establish a Packet Data Protocol context (PDP context). The SGSN finds an associated GGSN according to an access point name (APN) in the user subscription information, and requests the GGSN to add a PDP context. After receiving the request for adding a PDP context, the GGSN returns to the SGSN an IP address and a GPRS Tunneling Protocol (GTP) tunnel endpoint identifier (TEID) that are assigned to the UE. The SGSN returns to the UE a message that the PDP context is successfully established, and instructs the UTRAN or the GERAN to establish a corresponding radio air interface bearer to transmit user data.

After passing through the UTRAN/GERAN and the SGSN, uplink data of the UE is forwarded by the GGSN to a corresponding PDN. Downlink data from the external PDN is transmitted by the GGSN to an SGSN of the UE through a corresponding GTP tunnel according to the IP address of the UE, and is then sent to the UE by the SGSN by using the GERAN/UTRAN.

Referring to FIG. 2, an evolved network developed at the 3GPP specification release (R) 8 stage includes an evolved universal terrestrial radio access network (E-UTRAN), which may be also considered as a type of a radio access network RAN and is configured to implement a wireless function related to an evolved network. A mobility management entity (MME) is responsible for mobility management of a control plane, including management on a user context and mobile state, allocation of a temporary mobile subscriber identity (TMSI), or the like. A serving gateway entity (S-GW) is a user plane anchor between 3GPP radio access networks (such as an E-UTRAN, a UTRAN, and a GERAN). A packet data network gateway entity (P-GW) is a user plane anchor between a 3GPP radio access network and a non-3GPP radio access network, and provides an interface with an external PDN.

In the evolved network shown in FIG. 2, after accessing the E-UTRAN by using a radio air interface, UE is first attached to the MME; after the MME completes UE authentication according to user subscription data and authentication information that are obtained from a home subscriber server (HSS), the UE or the MME initiates a procedure of establishing a bearer used to transmit user data. The MME instructs the S-GW to establish the bearer for the UE, and the S-GW establishes for the UE a bearer from the E-UTRAN to the P-GW used to transmit user data. The P-GW forwards, to the UE by using the established bearer, downlink data from the external PDN, and forwards, to the PDN, uplink data from the UE.

As shown in FIG. 2, to be compatible with the existing UTRAN and GERAN, the UE may alternatively access the MME by using the UTRAN or the GERAN, and an SGSN, and may establish a GTP tunnel connection to the S-GW by using the UTRAN/GERAN and the SGSN. The S-GW converts the GTP tunnel into a corresponding P-GW-connected bearer that is used to transmit user data. The UTRAN may alternatively establish a GTP tunnel directly connected to the S-GW.

In a network architecture shown in FIG. 2, the MME is a network element that processes only control plane signaling. The S-GW and the P-GW may be combined into one network element, generally collectively referred to as a gateway.

In the network architectures shown in FIG. 1 and FIG. 2, the S-GW, the P-GW, and the GGSN may be collectively referred to as a gateway which is used as an interface between a radio access network and an external PDN to implement user data forwarding.

For a network architecture in which a control plane and a user plane of a gateway are separate, refer to FIG. 3. A gateway is divided into a user plane gateway (GW-U) and a control plane gateway (GW-C).

Referring to FIG. 3, UE accesses a wireless communications system shown in FIG. 3 by using a radio access network. The radio access network is connected to an MME/SGSN and a GW-U. A GW-C is connected to the MME/SGSN and may be configured to perform session management, IP address assignment, and the like. The GW-U is configured to forward user data. The GW-U forwards, to a PDN, user data from the radio access network, and forwards, to the radio access network, user data from the PDN.

The GW-C may be referred to as a control plane gateway, or may be referred to as a gateway controller, a control node, or a control gateway.

The GW-U may alternatively be referred to as a packet data forwarding gateway, a routing forwarding node, or a switch node.

Currently, in an architecture shown in FIG. 3, the GW-U needs to process user data according to a control message of the GW-C. This lacks flexibility.

SUMMARY

In view of this, embodiments of the present disclosure provide a user data processing apparatus and method, and a system, so as to provide a solution in which a GW-U flexibly processes user data.

According to a first aspect, an embodiment of the present disclosure provides a user data processing apparatus, including:

an interface management unit, configured to receive user data; and at least two service units, configured to process the user data, where the at least two service units include a session unit and at least one of a bearer unit, a service flow unit, or a content unit; the session unit is configured to perform session processing, the bearer unit is configured to perform bearer processing, the service flow unit is configured to perform service flow processing, and the content unit is configured to perform content processing;

the interface management unit is further configured to determine the session unit configured to process the user data, and send the received user data to the determined session unit; and the session unit is further configured to determine another service unit configured to process the user data.

According to a second aspect, an embodiment of the present disclosure provides a gateway user plane GW-U, where the GW-U includes the apparatus according to any one of the first aspect or the second to the thirteenth possible implementations of the first aspect.

According to a third aspect, an embodiment of the present disclosure provides a gateway configuration apparatus, including:

a processing unit, configured to determine that a service unit processing user data needs to be added to a gateway user plane GW-U; and a sending unit, configured to send a first request message to the GW-U, where the first request message is used to request to add the service unit processing the user data to the GW-U, where the service unit processing the user data includes a session unit and at least one of a bearer unit, a service flow unit, or a content unit; the session unit is configured to perform session processing, the bearer unit is configured to perform bearer processing, the service flow unit is configured to perform service flow processing, and the content unit is configured to perform content processing.

According to a fourth aspect, an embodiment of the present disclosure provides a gateway control plane GW-C, where the GW-C includes the apparatus according to any one of the third aspect or the possible implementations of the third aspect.

According to a fifth aspect, an embodiment of the present disclosure provides a user data processing method, including:

receiving, by a gateway user plane GW-U, user data, where the GW-U includes at least two service units configured to process the user data;

determining, by the GW-U, a service unit configured to process the user data, where the service unit configured to process the user data includes a session unit and at least one of a bearer unit, a service flow unit, or a content unit; the session unit is configured to perform session processing, the bearer unit is configured to perform bearer processing, the service flow unit is configured to perform service flow processing, and the content unit is configured to perform content processing; and processing, by the GW-U, the user data by using the determined service unit.

According to a sixth aspect, an embodiment of the present disclosure provides a computer readable medium, including:

computer programming code, where the computer programming code enables, when being executed by a computer unit, the computer unit to execute the method according to any one of the fifth aspect or the second to the thirteenth possible implementations of the fifth aspect.

According to a seventh aspect, an embodiment of the present disclosure provides a gateway configuration method, including:

determining, by a gateway control plane GW-C, that a service unit processing user data needs to be added to a gateway user plane GW-U; and sending, by the GW-C, a first request message to the GW-U, where the first request message is used to request to add the service unit processing the user data to the GW-U, where the service unit processing the user data includes a session unit and at least one of a bearer unit, a service flow unit, or a content unit; the session unit is configured to perform session processing, the bearer unit is configured to perform bearer processing, the service flow unit is configured to perform service flow processing, and the content unit is configured to perform content processing.

According to an eighth aspect, an embodiment of the present disclosure provides a computer readable medium, including:

computer programming code, where the computer programming code enables, when being executed by a computer unit, the computer unit to execute the method according to any one of the seventh aspect or the possible implementations of the seventh aspect.

According to a ninth aspect, an embodiment of the present disclosure provides a communications system, including a gateway user plane GW-U and a gateway control plane GW-C, where the GW-C is configured to send a first request message to the GW-U, where the first request message is used to request to add a service module processing user data to the GW-U; the service module processing the user data includes a session module and at least one of a bearer module, a service flow module, or a content module; the session module is configured to perform session processing, the bearer module is configured to perform bearer processing, the service flow module is configured to perform service flow processing, and the content module is configured to perform content processing; and the GW-U is configured to: receive the first request message sent by the GW-C, and add, according to the first request message, the service module processing the user data; and when receiving the user data, process the user data by using the added service module processing the user data.

To sum up, in the embodiments of the present disclosure, after receiving the user data, the GW-U determines the service unit configured to process the user data, and processes the user data by using the service unit determined by the GW-U, improving processing flexibility of the GW-U.

Further, the GW-C performs a configuration operation, such as adding, modification, or deletion, on the service unit in the GW-U, so that service units in the GW-U can be flexibly combined. Different from that in an existing network, this can avoid frequently changing the GW-U, and the GW-U does not always need to be modified each time service function logic is added. In this way, user data can be flexibly processed according to a service requirement of the user data. For example, a service unit can be flexibly added or removed in a process of processing the user data, so that the GW-U is able to adapt to a future new service type of user data.

After the GW-C completes configuring the GW-U, the GW-U can independently process the user data without interacting with the GW-C. This decreases coupling between the GW-U and the GW-C and reduces signaling overheads, and also decreases coupling between service units in the GW-U.

Further, the GW-C may further configure the template of the service unit in the GW-U, so that a service unit can be modified or added to the GW-U based on the existing template. This reduces signaling exchange between the GW-C and the GW-U.

Further, when configuring the service unit, the GW-C may deliver, to the GW-U, processing order information of each service unit that is configured to process the user data. When the GW-U internally processes the user data, the processing order information and the user data may be transmitted between the service units, instead of being returned to the interface management unit to reallocate a service unit to process the user data.

Further, when configuring the service unit in the GW-U, the GW-C adds the user data forwarding information to the service unit configuration information, and configures the service unit configuration information for the service unit, to instruct the service unit to send the processed user data to the another GW-U used as a mobile anchor, or to forward the processed user data to the PDN. In this way, user data that does not need to be processed by the mobile anchor directly enters the PDN. This reduces processing load of the mobile anchor and reduces a delay of transmitting the user data.

Further, whether the user data is processed by the mobile anchor may be determined according to the service type of the user data. User data that ensures service continuity is sent to the mobile anchor for processing, so as to ensure service continuity when the terminal moves.

DESCRIPTION OF EMBODIMENTS

Figure 1:
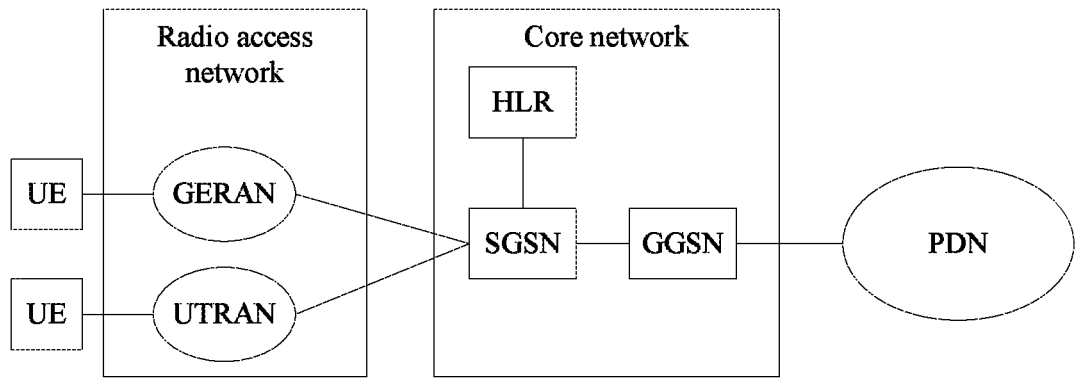
FIG. 1 is a schematic diagram of a wireless communications system.
Figure 2:
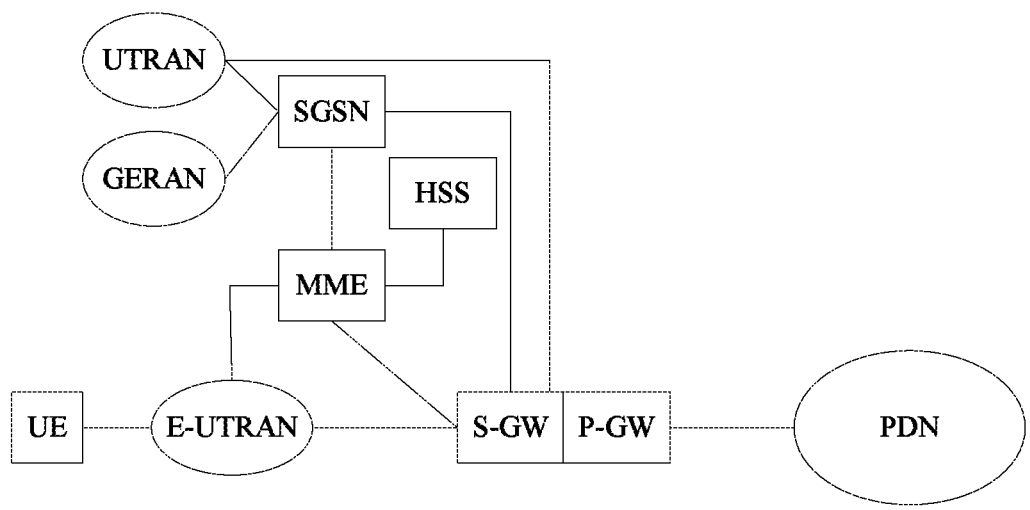
FIG. 2 is a schematic diagram of an evolved network.
Figure 3:
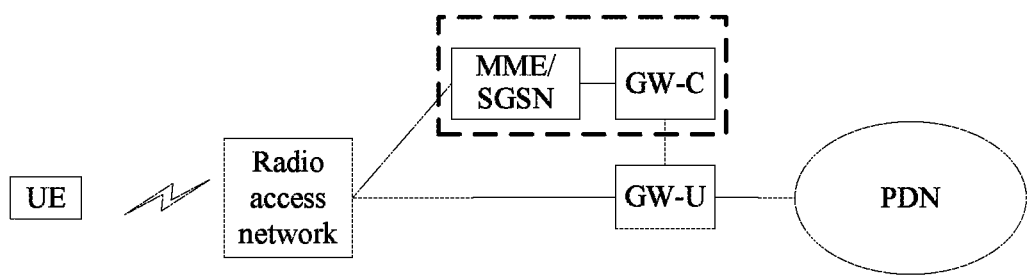
FIG. 3 is a schematic diagram of a network architecture in which a control plane and a user plane of a gateway are separate.

Embodiments of the present disclosure provide a user data processing apparatus and method, and a system, so as to provide a solution in which a GW-U flexibly processes user data.

In the embodiments of the present disclosure, a GW-U receives user data, determines a service unit configured to process the received user data, and processes the received user data by using the determined service unit. The service unit configured to process the received user data includes a session unit and at least one of a bearer unit, a service flow unit, or a content unit. The session unit is configured to perform session processing, the bearer unit is configured to perform bearer processing, the service flow unit is configured to perform service flow processing, and the content unit is configured to perform content processing.

After receiving the user data, the GW-U determines the service unit configured to process the user data, and processes the user data by using the service unit determined by the GW-U. This improves processing flexibility of the GW-U.

For ease of understanding, the following describes basic concepts in the embodiments of the present disclosure.

1. Class, Object, and Instantiation

A class, an object, and instantiation are concepts in an object-oriented approach.

A class is an abstract attribute and/or behavior of a thing. For example, a gateway has an IP address attribute, and the gateway also has behavior of assigning a terminal IP address and forwarding data.

An object is an instance of a class. For example, a gateway is used as an object, and an attribute of the gateway includes: an IP address is X.X.X.X, and behavior of the gateway may include: assigning an Internet Protocol (IP) version (v) 4/IPv6 address to UE, and forwarding user data between a PDN and the UE by the gateway. In the embodiments of the present disclosure, the object may also be referred to as an "object instance" or an "instance" for short.

Instantiation is a process of generating a concrete object based on a template being a class. For example, a gateway object is added that has an IP address and a function such as IP address assignment or data forwarding.

2. User Service

A user service includes but is not limited to one of the following services: accessing a network by a terminal to establish a data connection, forwarding terminal service data by a network, processing terminal service data by a network, or the like. In the embodiments of the present disclosure, the user service may be referred to as a "service" for short, and the two concepts are equivalent.

3. User Data

User data may also be referred to as "service data" and is data transmitted between a terminal and a network and used to carry a specific user service. The user data is different from control signaling. The control signaling is signaling that is transmitted between a terminal and a network or within a network to implement connection control, network security, bearer allocation, and the like.

4. PDN

A PDN is an external packet data network connected to a gateway, and may be the Internet, a virtual private network (VPN), an IP multimedia service (IMS) network, or a Wireless Application Protocol (WAP) network provided by an operator.

5. Mobile Anchor

Figure 4:
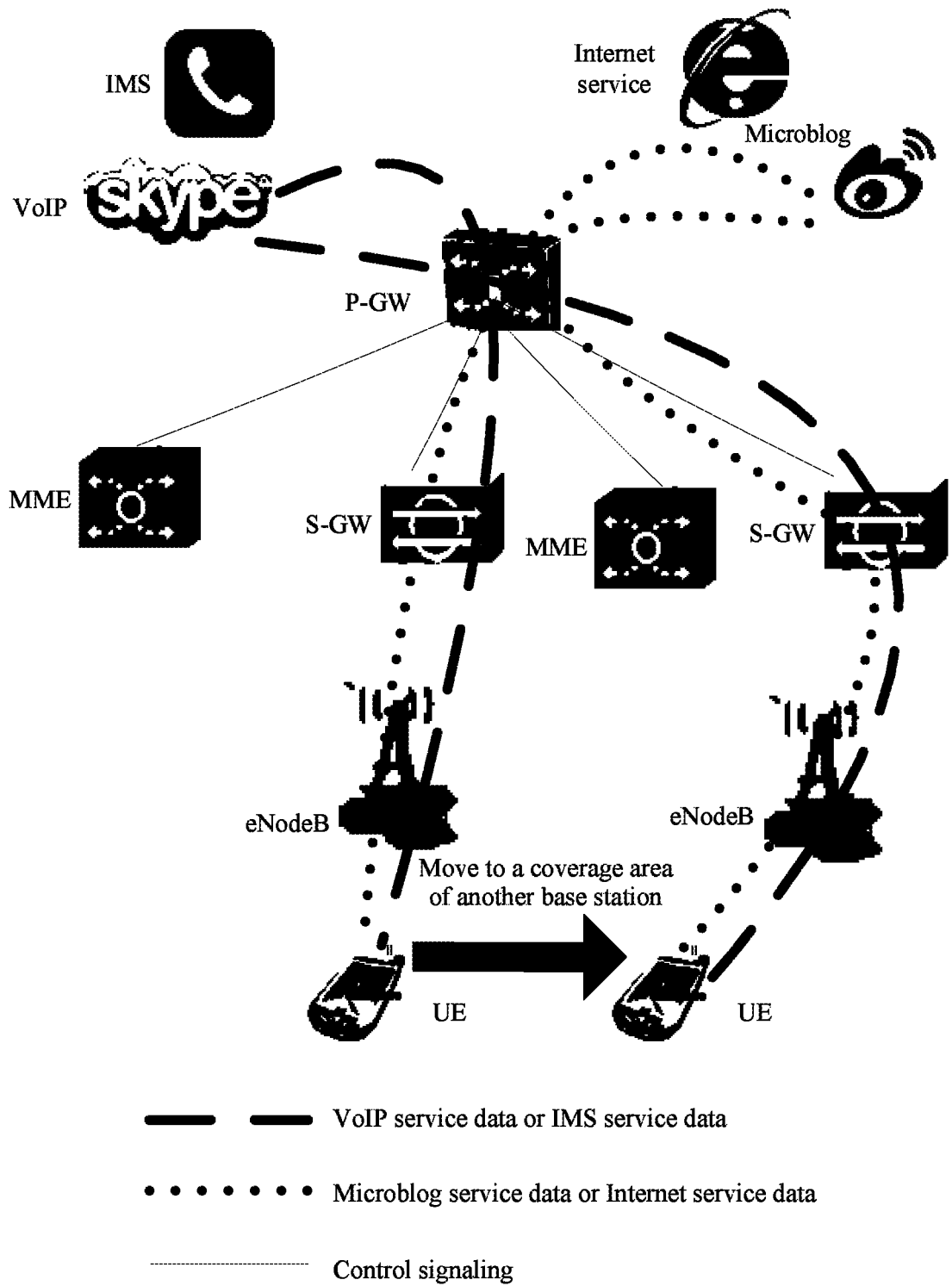
FIG. 4 is a schematic diagram of a process of transmitting service data and control signaling in a wireless network.

FIG. 4 shows an optional process of transmitting service data and control signaling in a wireless network. As shown in FIG. 4, in a conventional wireless communications system, a GGSN or a P-GW is used as a mobile anchor of downlink data and can remain an IP address of a terminal unchanged when the terminal moves between different base stations and/or different S-GWs, thereby ensuring mobile service continuity.

Using a mobile anchor can keep mobile service continuity, but results in problems, such as alternative routing, increase of a service latency, and increase of a backhaul network bandwidth. In conventional GSM, UMTS, and LTE wireless communications systems, all mobile services need to be transmitted by using the mobile anchor GGSN or P-GW.

6. Communications Standards and Terminals to which the Embodiments of the Present Disclosure are Applicable Communications standards to which the embodiments of the present disclosure are applicable include but are not limited to: the Global System for Mobile Communications (GSM), the Code Division Multiple Access (CDMA) IS-95, the CDMA 2000, the Time Division-Synchronous Code Division Multiple Access (TD-SCDMA), the Wideband Code Division Multiple Access (WCDMA), the Time Division Duplex-Long Term Evolution (TDD LTE), the Frequency Division Duplex-Long Term Evolution (FDD LTE), the Long Term Evolution-Advanced (LTE-advanced), the personal handy-phone system (PHS), the Wireless Fidelity (WiFi) stipulated in the 802.11 series of protocols, the Worldwide Interoperability for Microwave Access (Wi-MAX), and various future evolved wireless communications systems.

In the embodiments of the present disclosure, a terminal may be a wireless terminal. The wireless terminal may be a device providing voice and/or data connectivity for a user, or may be a handheld device having a wireless connection function, or another processing device connected to a wireless modem. The wireless terminal may communicate with one or more core networks by using a radio access network (RAN). The wireless terminal may be a mobile terminal, such as a mobile phone (also referred to as a "cellular" phone) or a computer having a mobile terminal. For example, the computer having a mobile terminal may be a portable, pocket-sized, handheld, computer built-in, or in-vehicle mobile apparatus, which exchanges voice and/or data with the radio access network. For example, the wireless terminal may be a personal communications service (PCS) phone, a cordless telephone set, a Session Initiation Protocol (SIP) phone, a wireless local loop (WLL) station, a personal digital assistant (PDA), or another device. The wireless terminal may alternatively be referred to as a subscriber unit, a subscriber station, a mobile station, a remote station, an access point, a remote terminal, an access terminal, a user terminal, a user agent, a user device, or user equipment.

7. Others

The terms "system" and "network" in this specification can often be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

An identifier or identifier information is used to identify an object. The object may be a terminal or a user. The identifier may include at least one of a name, a number, or an ID (Identification), provided that the identified object can be distinguished from another object.

The foregoing describes the basic concepts in the embodiments of the present disclosure. The following describes in detail the embodiments of the present disclosure with reference to drawings.

Figure 5:
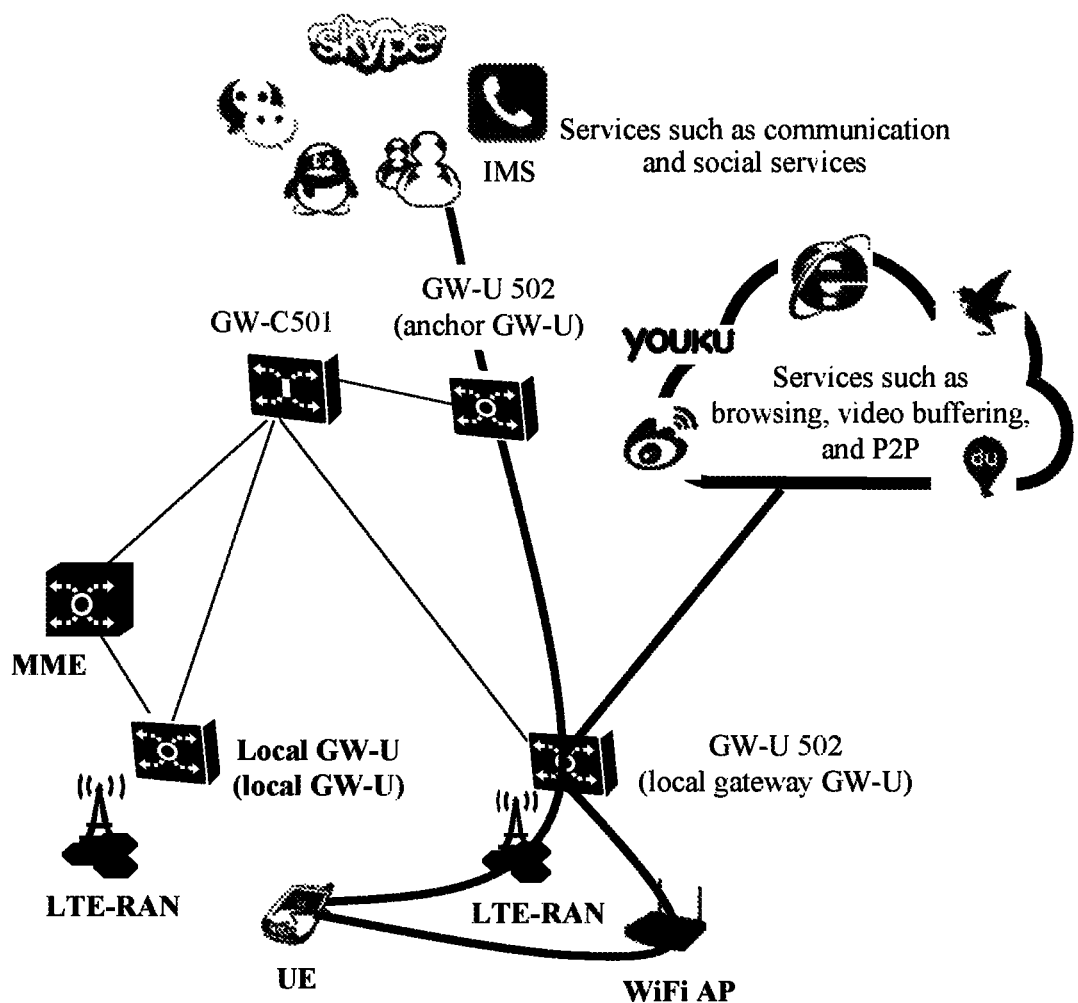
FIG. 5 is a schematic diagram of a communications system according to an embodiment of the present disclosure.

FIG. 5 is a schematic diagram of a communications system according to an embodiment of the present disclosure. The communications system includes a GW-C 501 and a GW-U 502 that are separate, a terminal (for example, UE), a radio access network (for example, an LTE radio access network LTE-RAN and a WiFi access point AP), an MME, and a PDN (for example, an IMS and the Internet). The terminal accesses the local gateway GW-U 502 by using the radio access network and then accesses the Internet from the local gateway GW-U 502. Alternatively, the terminal accesses the IMS by using the local gateway GW-U 502 and an anchor GW-U 502. The GW-C 501 is connected to the GW-U 502 and the MME. As a control plane device, the MME is responsible for mobility management of the UE. The GW-C 501 is responsible for controlling the GW-U 502 to establish a service module or the like.

After a GW-C and a GW-U are separate, the GW-U may be deployed in a distributed manner, that is, the GW-U may be deployed at different locations in a network.

In the communications system shown in FIG. 5, the GW-C 501 is configured to send a first request message to the GW-U 502. The first request message is used to request to add a service unit processing user data to the GW-U. The service unit processing the user data may be divided into a session unit and at least one of a bearer unit, a service flow unit, or a content unit in descending order of granularities of processed services. The session unit, the bearer unit, the service flow unit, and the content unit are further described with reference to FIG. 6.

The GW-U 502 is configured to: receive the first request message sent by the GW-C 501, and add, according to the first request message, the service unit processing the user data; and when receiving the user data, process the user data by using the added service unit processing the user data.

The GW-U 502 may be further divided into an anchor GW-U and a local GW-U according to a deployment location in a transport network.

The anchor GW-U (Anchor GW-U) is deployed at a core convergence point of the transport network, and used as a mobile anchor. The local GW-U is deployed at a convergence point of the transport network or integrated into a base station, and used as a local access gateway.

Generally, the core convergence point may be deployed in a central city, for example, a provincial capital city or a convergence point of a backbone transport network. The anchor GW-U deployed here can reduce alternative routing. The convergence point may be deployed in an ordinary city and is used as a convergence point of a metropolitan area network, or deployed in a prefecture-level city or even a county-level city.

By setting the anchor GW-U 502 and the local GW-U 502, user data that does not need to be processed by the mobile anchor can directly enter the PDN. This reduces processing load of the mobile anchor and reduces transmission latency of the user data.

In this embodiment of the present disclosure, the GW-C 501 may interact with the GW-U 502, to manage and control the GW-U 502.

Control and management performed by the GW-U 502 on the GW-C 501 include at least one of the following:

1. Adding, Modifying, or Deleting a Service Unit 5022

The GW-C 501 may send a control message to the GW-U 502. The GW-U 502 (which may be specifically an interface management unit 5021 in the GW-U 502 mentioned below) receives the control message, and adds, modifies, or deletes a service unit 5022 according to the received control message.

The GW-C 501 performs a configuration operation, such as adding, modification, or deletion, on a service unit 5022 in the GW-U 502, so that service units 5022 in the GW-U 502 can be flexibly combined. Different from that in an existing network, this can avoid frequently changing the GW-U 502, and the GW-U 502 does not always need to be modified each time service function logic is added.

In addition, after the GW-C 501 configures the GW-U 502, the GW-U 502 can independently process the user data without interacting with the GW-C 501 again. This decreases coupling between the GW-U 502 and the GW-C 501 and reduces signaling overheads. In addition, this decreases coupling between service units in the GW-U 502.

2. Adding, Modifying, or Deleting a Template of a Service Unit 5022

The GW-C 501 may send a control message to the GW-U 502. The GW-U 502 (which may be specifically an interface management unit 5021 in the GW-U 502 mentioned below) receives the control message, and adds a service unit 5022 based on a saved template, or modifies or deletes the saved template.

The GW-C 501 configures the template of a service unit 5022 in the GW-U 502, so that a service unit 5022 can be modified or added to the GW-U 502 based on the existing template. This reduces signaling exchange between the GW-C 501 and the GW-U 502.

The following describes an optional solution for the GW-C 501 to control and manage a service unit 5022 in the GW-U 502, and describes an optional solution for the GW-C 501 to control and manage the template in the GW-U 502.

1. Adding, Modifying, or Deleting a Service Unit 5022

When receiving a connection establishment message sent from another network element, the GW-C 501 may determine that a service unit 5022 needs to be added to the GW-U 502.

For an optional implementation of the connection establishment message, refer to a procedure shown in the following FIG. 12.

The GW-C 501 sends the first request message to the GW-U 502, to request the GW-U 502 to add a service unit 5022. When the service unit 5022 is added, multiple cases including the following two cases exist:

Case 1: The added service unit 5022 includes a session unit and at least one of a bearer unit, a service flow unit, or a content unit.

Optionally, the GW-C 501 adds service data information to the first request message.

The service data information may include:

an IP address of a terminal to which the user data belongs, or at least one of tunnel information used to transmit the user data, IP 5-tuple information used to transmit the user data, or content information of the user data.

The IP address of the terminal to which the user data belongs may include at least one of a source IP address of the terminal or a destination IP address of the terminal.

The tunnel information used to transmit the user data may include at least one of the following information: GTP tunnel information or IP tunnel information, such as Generic Routing Encapsulation (GRE), Internet Protocol security (IPSec), Layer 2 Tunneling Protocol (L2TP), virtual local area network (VLAN), Virtual Extensible Local Area Network (VxLAN), or multimedia information provider (MIP) tunnel information.

Case 2: At least one of a bearer unit, a service flow unit, or a content unit is added, and the added service unit is associated with an existing session unit.

Optionally, the GW-C 501 adds some items of service data information to the first request message. The some items of the service data information may include at least one of tunnel information used to transmit the user data, IP 5-tuple information used to transmit the user data, or content information of the user data. For the case 1 or case 2, if the service data information includes the tunnel information, the added service unit 5022 may include a bearer unit;

if the service data information includes the IP 5-tuple information, the added service unit 5022 may include a service flow unit; or if the service data information includes the content information, the added service unit 5022 may include a content unit.

For each of the foregoing two cases, when the GW-C 501 sends the first request message, there may be the following two optional implementations:

Implementation 1

The first request message includes service unit configuration information of the added service unit 5022. The service unit configuration information may include information about an operation performed by the service unit 5022 and information about a parameter used by the service unit 5022 when the service unit 5022 processes the user data. For details, refer to the third and the fourth columns in the following Table 1, respectively.

Implementation 2

The first request message includes identifier information of the service unit configuration information of the added service unit 5022. The GW-U 502 determines the service unit configuration information according to the identifier information.

When the implementation 2 is used, the GW-U 502 and the GW-C 501 need to reach an agreement in advance on an association relationship between the service unit configuration information and the identifier information of the service unit configuration information. In this way, after receiving the identifier information, the GW-U 502 may determine associated service unit configuration information.

For example, multiple sets of service unit configuration information may be configured on the GW-U 502 in advance, and an identifier is allocated to each set of service unit configuration information. The first request message sent by the GW-C 501 may include identifier information of service unit configuration information. The GW-U 502 determines corresponding service unit configuration information according to the received identifier information.

The following details the foregoing two cases and two corresponding implementations.

Implementation 1 of Case 1

The first request message includes the service data information associated with the user data and service unit configuration information of the service unit.

After receiving the first request message, the interface management unit 5021 in the GW-U 502 adds the service unit 5022 and associates the service unit 5022 with the saved service data information and the service unit configuration information, that is, saves the service data information and the service unit configuration information, and saves association relationships between the foregoing two types of information and the service unit 5022.

Implementation 2 of Case 1

The first request message includes the service data information associated with the user data and identifier information of the service unit configuration information of the service unit 5022.

After receiving the first request message, the interface management unit 5021 in the GW-U 502 adds the service unit 5022, determines the service unit configuration information according to the identifier information of the service unit configuration information, and associates the service unit 5022 with the saved service data information and the determined service unit configuration information.

Implementation 1 of Case 2

The first request message includes identifier information of the existing session unit, the service unit configuration information of the service unit 5022, and some items in the service data information.

After receiving the first request message, the interface management unit 5021 in the GW-U 502 adds the service unit 5022, where the added service unit 5022 is associated with the session unit identified by the identifier information of the existing session unit; adds the foregoing some items to the original service data information, saves an association relationship between the session unit configured to process the user data and the service unit 5022, and associates the service unit 5022 with the saved service data information to which the some items have been added and the service unit configuration information, that is, saves the service data information and the service unit configuration information, and saves association relationships between the foregoing two types of information and the service unit 5022.

Implementation 2 of Case 2

The first request message includes identifier information of the session unit configured to process the user data, identifier information of the service unit configuration information of the service unit 5022, and some items in the service data information.

After receiving the first request message, the interface management unit 5021 in the GW-U 502 adds the service unit 5022, associates the added service unit 5022 with the existing session unit configured to process the user data, adds the some items to the original service data information, saves an association relationship between the session unit configured to process the user data and the service unit 5022, determines the service unit configuration information according to the identifier information of the service unit configuration information, and associates the service unit 5022 with the service data information to which the some items have been added and the service unit configuration information, that is, saves the service data information and the service unit configuration information, and saves association relationships between the foregoing two types of information and the service unit 5022.

Figure 7:
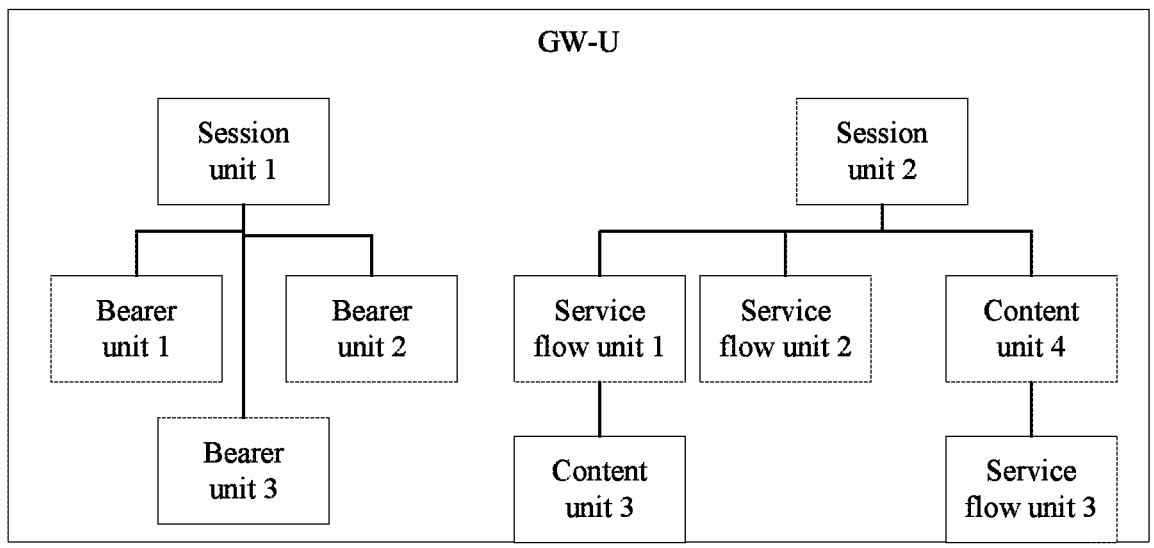
FIG. 7 is a schematic diagram of an association relationship of service units in a GW-U according to an embodiment of the present disclosure.

Referring to FIG. 7, the case 2 includes two sub-cases. One sub-case is to add a bearer unit to an existing user data processing branch. For example, a bearer unit is added on the basis of session unit 2-service flow unit 1-content unit 3 on the right of FIG. 7. After the bearer unit is added, the branch is session unit 2-added bearer unit-service flow unit 1-content unit 3. In this case, tunnel information corresponding to the added bearer unit needs to be added to original service data information corresponding to the branch.

The other sub-case is to add a user data processing branch. Still using the session unit 2 on the right of FIG. 7 as an example, it is assumed that there is no service flow unit 2 previously, and the service flow unit 2 needs to be added now. This branch does not exist previously, and therefore, service data information corresponding to the branch does not exist either. In this case, the service data information of the added branch needs to be saved. The service data information includes an IP address, of a terminal to which the user data belongs, corresponding to the session unit 2, and IP 5-tuple information corresponding to the added service flow unit 2.

In addition, the GW-U 502 may process the user data in a predetermined processing order. Optionally, when sending the first request message, the GW-C 501 may add processing order information of the foregoing predetermined processing order of the service unit 5022 that processes the user data. The GW-U 502 determines, according to the processing order information, the processing order of the service unit 5022 that processes the user data.

When configuring the service unit 5022, the GW-C 501 delivers, to the GW-U 502, processing order information of each service unit 5022 that is configured to process the user data. Therefore, when the GW-U 502 internally processes the user data, the processing order information and the user data may be transmitted between the service units 5022, instead of being returned to the interface management unit 5021 to reallocate a service unit 5022 to process the user data. This reduces signaling overheads.

In addition, the first request message may further include identifier information of the added service unit 5022. The identifier information is used to identify the added service unit 5022. The identifier information may be optional. After receiving the first request message and adding the service unit 5022, the GW-U 502 further needs to save the identifier information of the service unit 5022 in the first request message.

Alternatively, the first request message may exclude identifier information of the added service unit 5022. In this case, the GW-U 502 may allocate the identifier information.

Optionally, for the case 1 or case 2, or the implementation 1 or implementation 2, when the GW-C 501 controls the GW-U 502 to add the service unit 5022, the service unit 5022 may be added based on an existing template.

Optionally, the first request message further includes unit type information of the service unit 5022. The unit type information may include:

a type identifier of the service unit 5022, or an identifier of a template used by the service unit 5022.

After receiving the first request message, the GW-U 502 may determine, according to the unit type information of the service unit 5022, the service unit template used by the service unit 5022, and add the service unit 5022 based on the determined service unit template.

Generally, each type of service unit is corresponding to one or more templates of the type of service unit, and one of the templates is a default template. If the first request message includes the type identifier of the added service unit 5022, the GW-U 502 may determine a type of the added service unit 5022 according to the type identifier, and add the service unit 5022 according to a default template corresponding to the type.

If the first request message includes the identifier of the template used by the added service unit 5022, the GW-U 502 may determine a template used by the added service unit 5022 according to the identifier of the template, and add the service unit 5022 based on the determined template.

In this embodiment of the present disclosure, the template of the service unit 5022 may be specifically a class in an object-oriented technology. For example, a class corresponding to a template of a session unit is referred to as a "session class", a class corresponding to a template of a bearer unit is referred to as a "bearer class", a class corresponding to a template of a service flow unit is referred to as a "service flow class", and a class corresponding to a template of a content unit is referred to as a "content class".

Correspondingly, the service unit 5022 may be specifically an object instance of class instantiation, and the object instance may be referred to as an "object" or an "instance" for short. The object instance may be loaded onto or installed in the GW-U 502.

Before the object instances are loaded/installed, the GW-U 502 needs to allocate corresponding resources to these object instances, for example, allocate a memory, or a CPU process or thread to the object instance. Optionally, a network port, network bandwidth, or the like may be further allocated to the object instance, or a virtual machine or the like in a virtualized system is allocated to the object instance.

For example, the class may be corresponding to a "a type of a service unit" in the following Table 1; an ID of the object instance may be corresponding to a "session unit ID", a "bearer unit ID", a "service flow unit ID", a "content unit ID", or the like in Table 1. The ID of the object instance may be allocated by the GW-C 501, or may be allocated and associated by the GW-U 502. If the ID of the object instance is allocated by the GW-U 502, when the GW-U 502 generates the object instance, the allocated ID of the object instance is needed.

When the service unit 5022 is to be modified, the GW-C 501 may send to the GW-U 502 a control message used to modify the service unit 5022. The message may carry identifier information of the to-be-modified service unit 5022 and service unit configuration information of the to-be-modified service unit 5022. After receiving the control message, the GW-U 502 may determine the to-be-modified service unit 5022 according to the identifier information of the service unit 5022 in the control message, and update, according to the service unit configuration information in the control message, saved service unit configuration information associated with the service unit 5022.

When the service unit 5022 is to be deleted, the GW-C 501 may send to the GW-U 502 a control message used to delete the service unit 5022. The message may carry identifier information of the to-be-deleted service unit 5022. After receiving the control message, the GW-U 502 may determine the to-be-deleted service unit 5022 according to the identifier information of the service unit 5022 in the control message, and deletes the service unit 5022.

2. Adding, Modifying, or Deleting a Template

The GW-C 501 may send a control message to the GW-U 502. The GW-U 502 receives the control message, and adds a template, or modifies or deletes a saved template according to the received control message.

When the template is to be added, the control message may include a template identifier and description information of the template. For the description information of the template, refer to the third and the fourth columns in Table 1. After receiving the control message, the GW-U 502 adds the corresponding template, and saves the template identifier and the description information of the template.

When the saved template is to be modified, the control message may also include a template identifier of the to-be-modified template and description information of the to-be-modified template. After receiving the control message, the GW-U 502 determines the to-be-modified template according to the template identifier, and performs corresponding modification on the template according to the description information of the to-be-modified template in the message.

When the template is to be deleted, the control message may include a template identifier of the to-be-deleted template. After receiving the control message, the GW-U 502 determines the to-be-deleted template according to the template identifier and deletes the determined template.

Figure 9:
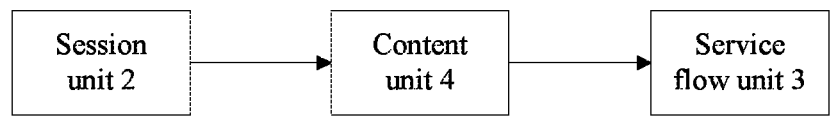
Figure 10:
Figure 11:
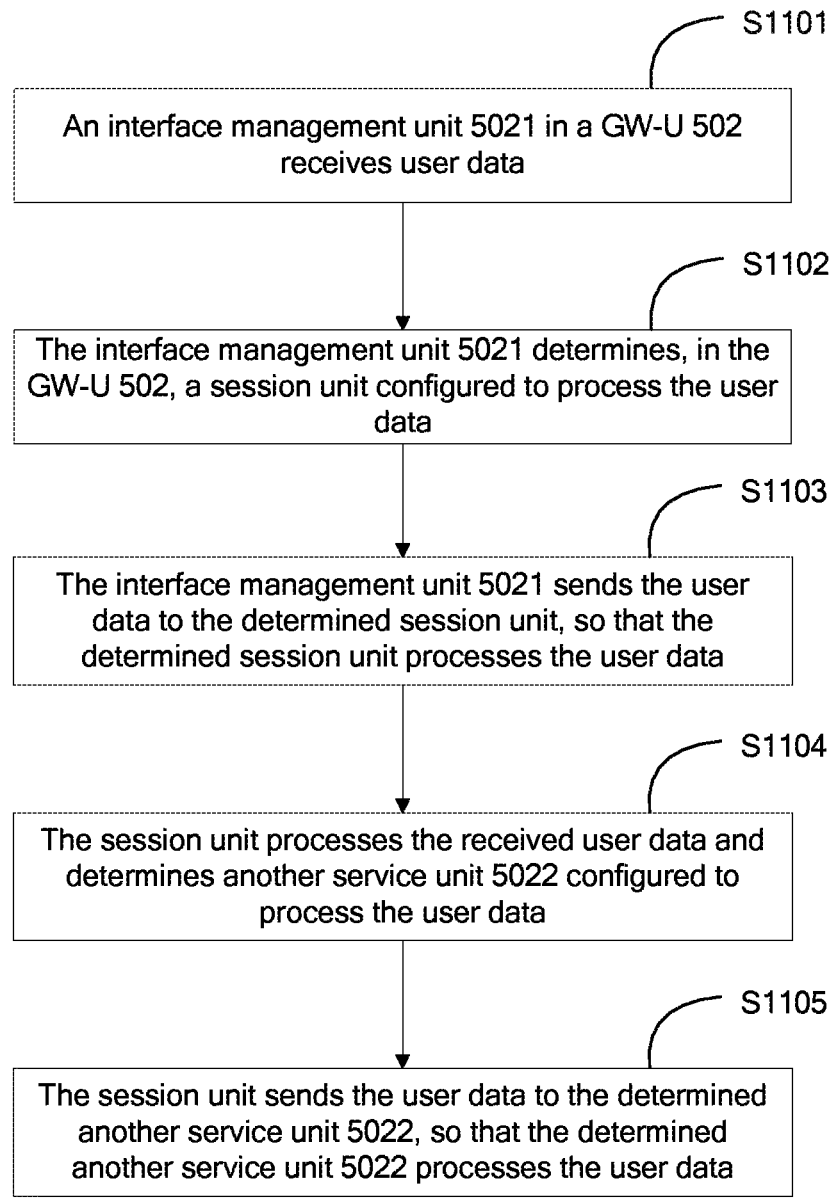
FIG. 11 is a schematic diagram of an optional procedure of processing user data by a GW-U according to an embodiment of the present disclosure.

The following describes compositions of the GW-U 502 and optional solutions for processing user data, with reference to FIG. 6 to FIG. 10, and describes an optional solution for the GW-C 501 to control and manage the GW-U 502, with reference to FIG. 11.

Figure 6:
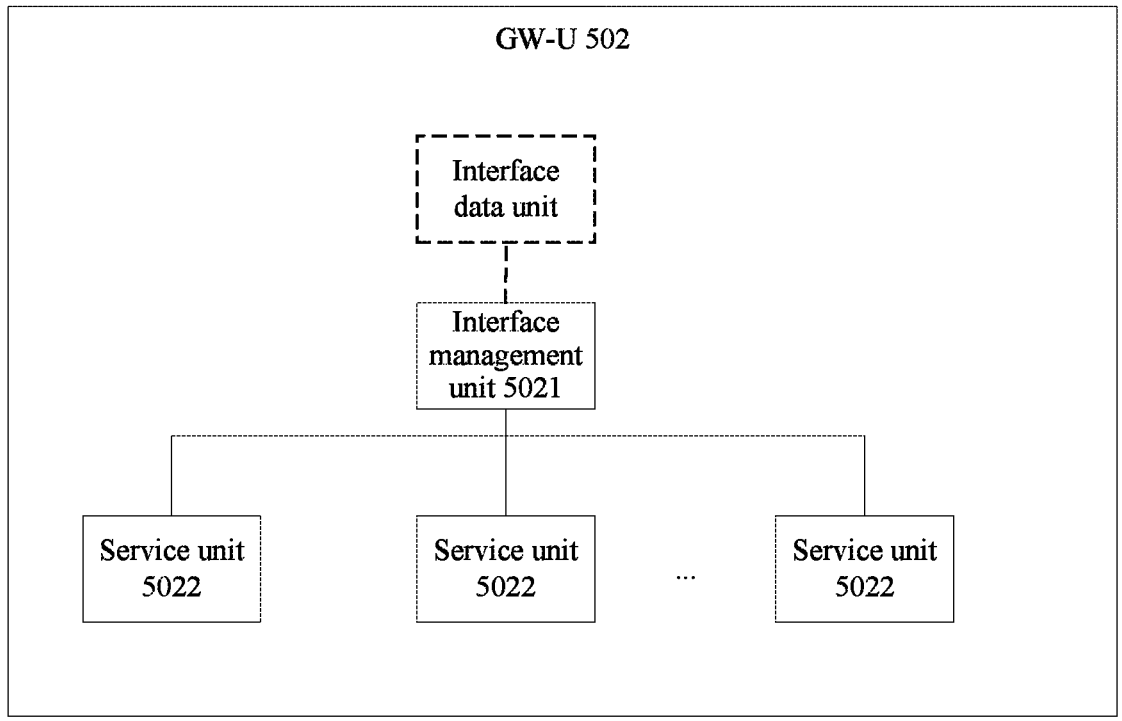
FIG. 6 is a schematic structural diagram of a GW-U according to an embodiment of the present disclosure.

FIG. 6 shows compositions of the GW-U 502 and an optional solution for processing user data.

As shown in the figure, the GW-U 502 includes an interface management unit 5021, and includes, for each terminal, one or more service units 5022 corresponding to the terminal, or includes, for each user service of each terminal, one or more service units 5022 corresponding to the user service of the terminal.

The interface management unit 5021 is configured to interact with the GW-C 501, so that the GW-C 501 manages the service unit 5022 on the GW-U 502.

The service unit 5022 is configured to process user data of the terminal.

The interface management unit 5021 is specifically configured to perform at least one of the following processing operations by interacting with the GW-C 501:

1. Adding, modifying, or deleting a service unit 5022

2. Adding, modifying, or deleting a template of the service unit 5022, where the template is used to define types of a function and an attribute of the service unit 5022, and for different service units 5022, corresponding templates may be defined, for example, a template of a session unit, a template of a bearer unit, a template of a service flow unit, or a template of a content unit.

3. Flexibly adding a new template of the service unit according to a user service, that is, a new template other than a template of a session unit, a template of a bearer unit, a template of a service flow unit, and a template of a content unit.

4. Receiving the user data, obtaining an IP address of the terminal to which the user data belongs from the user data, and determining a session unit configured to process the user data.

The foregoing fourth processing operation may alternatively be performed by an independent interface data unit. The interface data unit receives the user data and sends the user data to the interface management unit 5021. The interface management unit 5021 obtains the IP address of the terminal to which the user data belongs from the user data, and determines the session unit configured to process the user data. For example, the interface management unit 5021 performs matching between the IP address obtained from the user data and an IP address saved by an associated session unit; if the two addresses are consistent, uses the matched session unit as the session unit configured to process the data, and sends, to the interface data unit, information used for indicating an association relationship between the IP address of the terminal to which the user data belongs and the session unit, and the interface data unit sends the user data to the associated session unit according to the association relationship.

Optionally, when the interface data unit receives the user data, if the interface data unit determines that the interface data unit does not save the association relationship between the IP address of the terminal to which the user data belongs and the session unit, the interface data unit may send a request to the interface management unit 5021, to request the interface management unit 5021 to determine the associated session unit; save the association relationship after receiving information sent by the interface management unit 5021 for indicating the association relationship; and after receiving user data from the same IP address subsequently, directly send the user data to the associated session unit according to the saved association relationship, instead of determining the association relationship by using the interface management unit 5021.

For a same terminal or different types of user data of a same terminal, the GW-U 502 may include at least two service units 5022.

The service unit 5022 may be divided into the following four types in descending order of granularities of processed services: a session unit, a bearer unit, a service flow unit, and a content unit.

The session unit may be configured to perform session processing on the user data, for example, maintaining aggregation QoS control of a terminal in an APN (for example, aggregation bandwidth control, that is, for an APN, limiting a total bandwidth occupied by all services corresponding to the APN), or an IP address management function.

The bearer unit may be configured to perform bearer processing on the user data, for example, one or more of data forwarding, QoS control, charging, bearer routing control, or bearer event reporting of a terminal bearer. Bearer QoS control may include QoS control on bandwidth, a delay, jitter, a priority, and the like of the user data. Bearer charging may include bearer traffic statistics or the like. Bearer event reporting may include bearer charging event reporting or the like, and the GW-C 501 may configure a trigger point of reporting a bearer event.

The service flow unit may be configured to perform transport layer processing on the user data, for example, one or more of parsing on an IP 5-tuple level data flow, QoS control, charging, service flow routing control, or service flow event reporting of a terminal data service flow. Service flow QoS control may include QoS control on bandwidth, a delay, jitter, a priority, and the like of the user data. Service flow charging may include service flow traffic statistics or the like. Service flow event reporting may include service flow charging event reporting or the like, and the GW-C 501 may configure a trigger point of reporting a service flow event.

The content unit may be configured to perform content processing on the user data, for example, data flow parsing, content data flow-level QoS control, content data flow charging and a content data flow switch function, content routing control, or content event reporting. The content unit may parse a data packet at layer 7 of an open system interconnection (OSI) model, for example, a uniform resource locator (URL). Service QoS control may include QoS control on bandwidth, a delay, jitter, a priority, and the like of the user data. Content charging may include content data traffic statistics. Content event reporting may include content charging event reporting or the like, and the GW-C 501 may configure a trigger point of reporting a content event.

Optionally, the service unit may be also referred to as a "service module"; the session unit may be also referred to as a "session module"; the bearer unit may be also referred to as a "bearer module"; the service flow unit may be also referred to as a "service flow module"; and the content unit may be also referred to as a "content module". In this case, a service module in the GW-U 502 processes the user data.

Optionally, the GW-U 502 may add a service unit by creating a service context. When the created service context is a session context, the added service unit is a session unit. When the created service context is a bearer context, the added service unit is a bearer unit. When the created service context is a service flow context, a service flow unit is added. When the created service context is a content context, the added service unit is a content unit. The GW-U 502 may process the user data according to the service context.

For example, after the terminal is attached, the GW-C 501 may control the GW-U 502 to add a session unit and a bearer unit. One bearer may be corresponding to one GTP tunnel. The bearer unit is configured to encapsulate the user data. For a web page browsing service, only a session unit and a bearer unit may be added. Alternatively, a bearer unit may not be added, and a default bearer unit is used for processing the user data.

For another example, the GW-C 501 obtains, from a PCRF, information about a user policy of the terminal, for example, an IP 5-tuple and QoS information. The GW-C 501 determines, according to the obtained user policy, that a service flow unit needs to be added to the GW-U 502 for the terminal. In this case, a session unit has been established, and association is established between the added service flow unit and the existing session unit. For example, for services such as VoIP, a video call, and games, a service flow unit needs to be added.

For a terminal, one or more session units that are associated with each other may generally exist on the GW-U 502. One session unit may be associated with one or more bearer units. One session unit may be associated with one or more service flow units. One session unit may be associated with one or more content units.

As shown in FIG. 7, for a terminal, the service unit 5022 in the GW-U 502 may include a session unit 1 and a session unit 2. The session unit 1 is associated with a bearer unit 1, a bearer unit 2, and a bearer unit 3. The session unit 2 is associated with a service flow unit 1, a service flow unit 2, and a content unit 4. The service flow unit 1 is further associated with a content unit 3. The content unit 4 is further associated with the service flow unit 3.

Generally, for a terminal, if the GW-U 502 includes a bearer unit, the bearer unit may be corresponding to a default bearer of the terminal, or may be corresponding to a dedicated bearer of the terminal.

The GW-U 502 needs to process user data of a terminal by using a combination of one or more service units 5022 corresponding to the terminal, for example, a combination of a session unit and a bearer unit. FIG. 14 to FIG. 19 further describe procedures of processing user data of a terminal by the GW-U 502 by using a service unit 5022 corresponding to the terminal.

As mentioned above, the service unit 5022 processing the user data, in the GW-U 502 may include a session unit and at least one of a bearer unit, a service flow unit, or a content unit. FIG. 11 shows a procedure of processing user data by a GW-U 502 according to an embodiment of the present disclosure. As shown in FIG. 11, the procedure of processing user data by a GW-U 502 may include the following steps:

S1101: An interface management unit 5021 receives user data.

S1102: The interface management unit 5021 determines, in the GW-U 502, a session unit configured to process the user data.

S1103: The interface management unit 5021 sends the user data to the determined session unit, so that the determined session unit processes the user data.

S1104: The session unit processes the received user data and determines another service unit 5022 configured to process the user data.

S1105: The session unit sends the processed user data to the another service unit 5022, so that the determined another service unit processes the user data.

Optionally, in step S1102, the interface management unit 5021 in the GW-U 502 may use a session unit associated with an IP address in service data information, as the session unit configured to process the user data.

In step S1104, the session unit may obtain the service data information from the user data, and determine, according to the obtained service data information, the another service unit 5022 configured to process the user data.

In this case, the session unit may determine the another service unit 5022 configured to process the user data in the following manners:

If the service data information includes tunnel information, the session unit uses a bearer unit associated with the tunnel information in the service data information, as a bearer unit configured to process the user data.

If the service data information includes IP 5-tuple information, the session unit uses a service flow unit associated with the IP 5-tuple information in the service data information, as a service flow unit configured to process the user data.

If the service data information includes content information, the session unit uses a content unit associated with the content information in the service data information, as a content unit configured to process the user data.

Optionally, in step S1103, the session unit may process the user data by using saved service unit configuration information associated with the session unit. In step S1105, the service unit 5022 may process the user data by using saved service unit configuration information associated with the service unit 5022.

The service unit configuration information may include information about an operation performed by the service unit 5022 and information about a parameter used by the service unit 5022 when the service unit 5022 processes the user data. For details, refer to the third and the fourth columns in the following Table 1.

TABLE 1

Description information of the service unit

| Service unit type | Service unit function | Service unit attribute (operation function list (Operation List or Operation Group) or component group (Component or Component Group)) | Service unit configuration information (service unit configuration information, operation function configuration information or component information) |
| --- | --- | --- | --- |
| Session unit | Session-level QoS control and IP address management | Data matching, QoS control, IP address management, event reporting, and data forwarding | Session unit ID<br>Terminal identifier (optional)<br>APN (optional)<br>Session QoS information (optional)<br>Session data forwarding table (optional)<br>Terminal IP address<br>List of service units matching session data<br>Session event list information (optional) |
| Bearer unit | Bearer data forwarding, bearer QoS control, charging, and service routing control | Data forwarding, bearer QoS control, bearer charging, bearer routing control, and bearer event reporting | Bearer unit ID<br>Bearer identifier (optional)<br>Terminal IP address (optional)<br>GTP tunnel information<br>Bearer QoS (optional)<br>Bearer charging rule (optional)<br>Bearer event list (optional)<br>Bearer data forwarding table |
| Service flow unit | IP 5-tuple data flow service parsing, QoS control, charging, and service routing control | Data forwarding, service flow parsing, service flow QoS control, service flow charging, service routing control, and service flow event reporting | Service flow unit ID<br>Terminal identifier (optional)<br>Bearer identifier (optional)<br>Service flow identifier (optional)<br>Service flow information<br>Terminal IP address (optional)<br>Service flow QoS (optional)<br>Service flow charging rule (optional)<br>Service flow event list (optional) |

TABLE 1-continued

Description information of the service unit

| Service unit type | Service unit function | Service unit attribute (operation function list (Operation List or Operation Group) or component group (Component or Component Group)) | Service unit configuration information (service unit configuration information, operation function configuration information or component information) |
|---|---|---|---|
| Content unit | Content data flow service parsing, QoS control, charging, and service routing control | Data forwarding, content parsing, content QoS control, content charging, content routing control, and content event reporting | Service flow data forwarding table<br>Content unit ID<br>Terminal identifier (optional)<br>Bearer identifier (optional)<br>Content identifier<br>Content information<br>User IP address (optional)<br>Content QoS (optional)<br>Content charging rule (optional)<br>Content event list (optional)<br>Content data forwarding table |

For descriptions about each service unit, refer to FIG. 6. Details are not further described herein. A function that each service unit 5022 can execute may be configured when the GW-C 501 adds/modifies the service unit 5022, and may be associated with service unit configuration information of the service unit 5022 that is saved in the service unit 5022. That means the service unit configuration information is saved, and an association relationship between the service unit configuration information and the service unit 5022 is saved.

The description information of the service unit provided in Table 1 is an optional implementation. The first, the second, and the fourth columns may be content in the description information of the service unit. The second column of service unit function is used to explain a function implemented by a corresponding service unit type, and may not be included in the description information.

For optional implementation solutions of processing the user data by the GW-U 502, refer to the following procedures of processing the user data shown in FIG. 14 to FIG. 19.

Optionally, service units 5022 in the GW-U 502 may process the user data in order. Optionally, first, the session unit in the GW-U 502 processes the user data; and then, the session unit configured to process the user data sends the user data and information about a predetermined processing order to a next-hop service unit indicated by the predetermined processing order, in the predetermined processing order, to instruct a subsequent service unit 5022 including the next-hop service unit to process the user data in the predetermined processing order. In this way, the user data can be transmitted directly between the service units 5022, instead of being returned to the interface management unit 5021 or the GW-C 501 to reallocate another service unit 5022. This reduces data and signaling exchange, and improves processing efficiency of user data.

The predetermined processing order may be defined when the GW-C 501 adds the service unit 5022 configured to process the user data. The GW-U 502 saves the information about the predetermined processing order, so as to process the user data in the predetermined processing order subsequently.

Optionally, the processing order information may be implicitly stored on the "list of service units matching session data" in the "service unit configuration information" of the session unit in Table 1. The list may include a list of multiple service units 5022 configured to process one piece of user data. An order of the service units 5022 on the list is the predetermined processing order.

Optionally, the information about the predetermined processing order may be implemented by meta data. The meta data may be generated by the session unit, attached to a header of the user data, and sent with the user data.

The service unit 5022 receiving the user data obtains the meta data from the header of the user data, determines, according to the meta data, whether to forward the user data to another service unit 5022 after the service unit 5022 completes processing the user data, determines a service unit 5022 to which the user data needs to be forwarded if the user data needs to be forwarded to another service unit 5022, and after determining the service unit 5022 to which the user data needs to be forwarded, still attaches the meta data to a header of service data and sends the service data to the determined target service unit 5022, so as to facilitate further processing by the target service unit 5022.

For example, the meta data may be a list of service units 5022, and used to indicate one or more service units 5022 that the user data passes through and an order of the service units 5022 that the user data passes through. The list may be mapped as a label, and the label is added to the user data and sent to a next service unit 5022.

Figure 8:
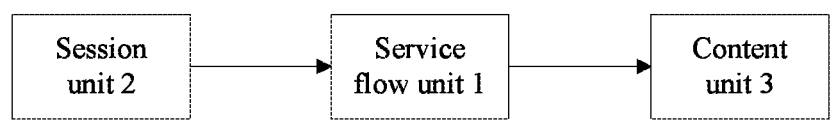
FIG. 8 to FIG. 10 are schematic diagrams of a processing order of service units in a GW-U according to an embodiment of the present disclosure.

For example, for a left branch of the session unit 2 in FIG. 7, a processing order of user data that is indicated by meta data generated by the session unit 2 may be shown in FIG. 8.

For another example, for a right branch of the session unit 2 in FIG. 7, a processing order of user data that is indicated by meta data generated by the session unit 2 may be shown in FIG. 9.

For still another example, for a left branch of the session unit 1 in FIG. 7, a processing order of user data that is indicated by meta data generated by the session unit 1 may be shown in FIG. 10.

In the procedure shown in FIG. 11, after receiving the user data, the GW-U 502 determines the service unit configured to process the user data, and processes the user data by using the service unit determined by the GW-U 502. This improves processing flexibility of the GW-U.

Figure 12:
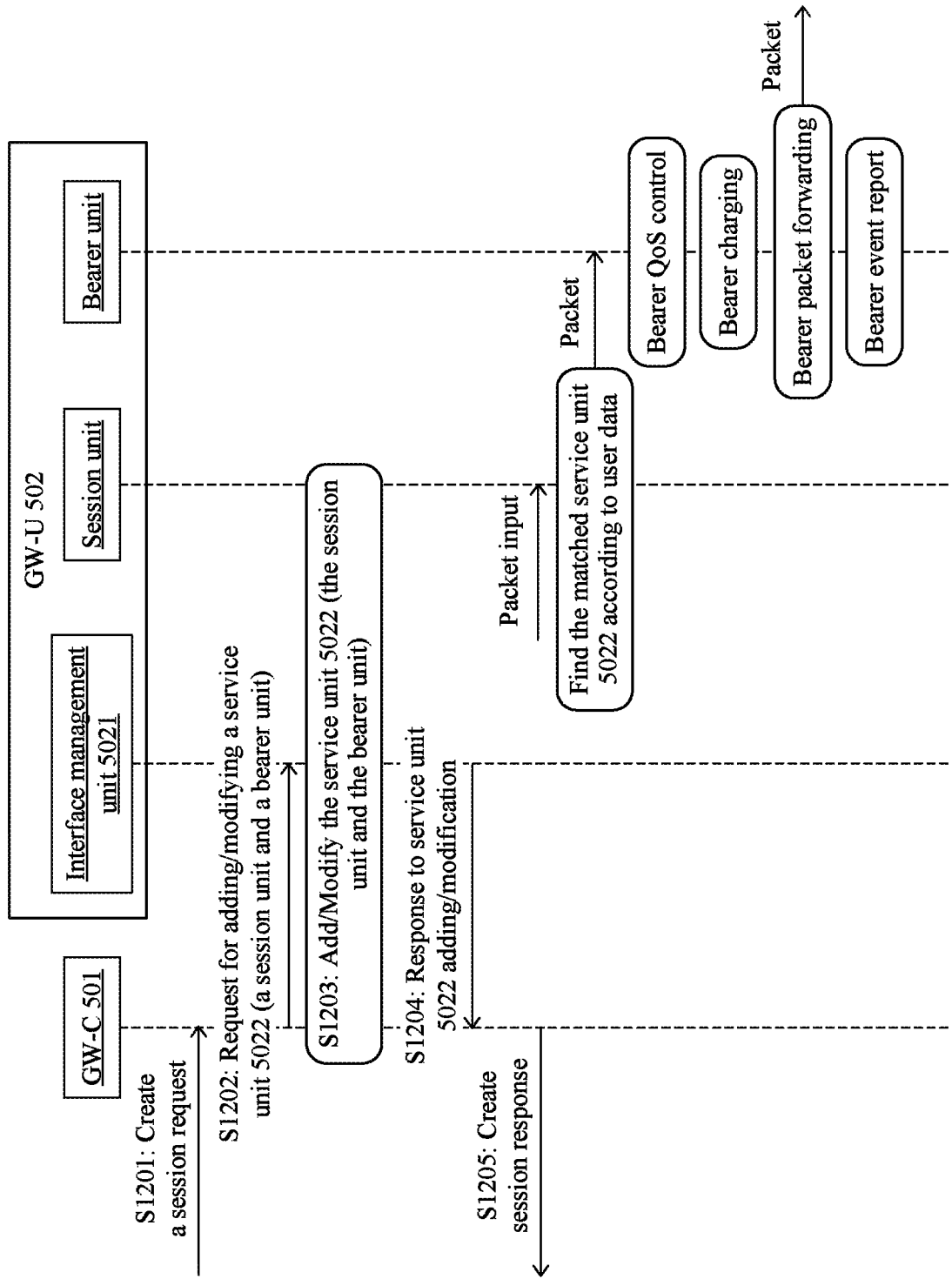
FIG. 12, FIG. 13A, and FIG. 13B are schematic diagrams of an optional procedure of controlling a GW-U by a GW-C to establish a service unit according to an embodiment of the present disclosure.
Figure 13A:
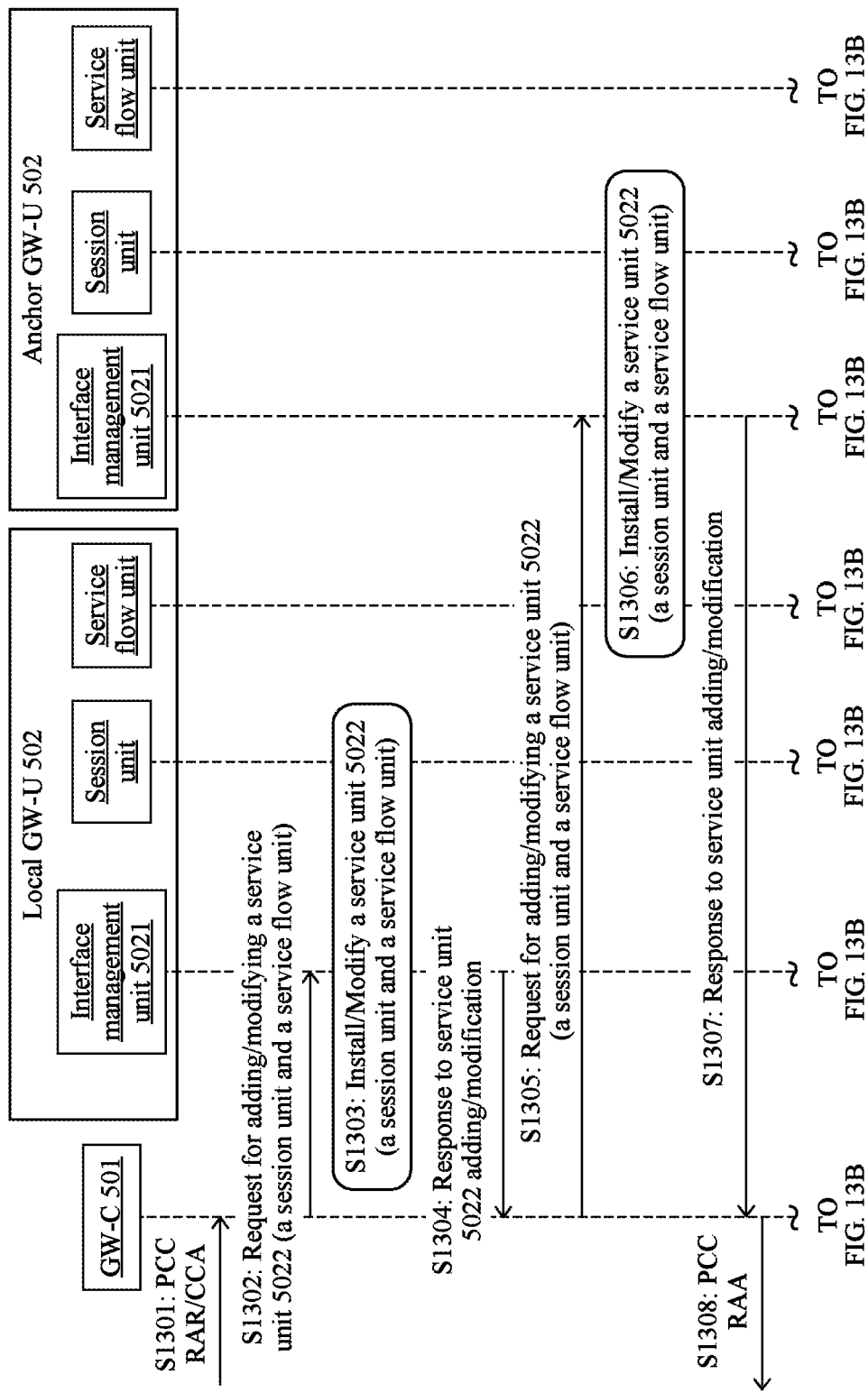
Figure 13B:
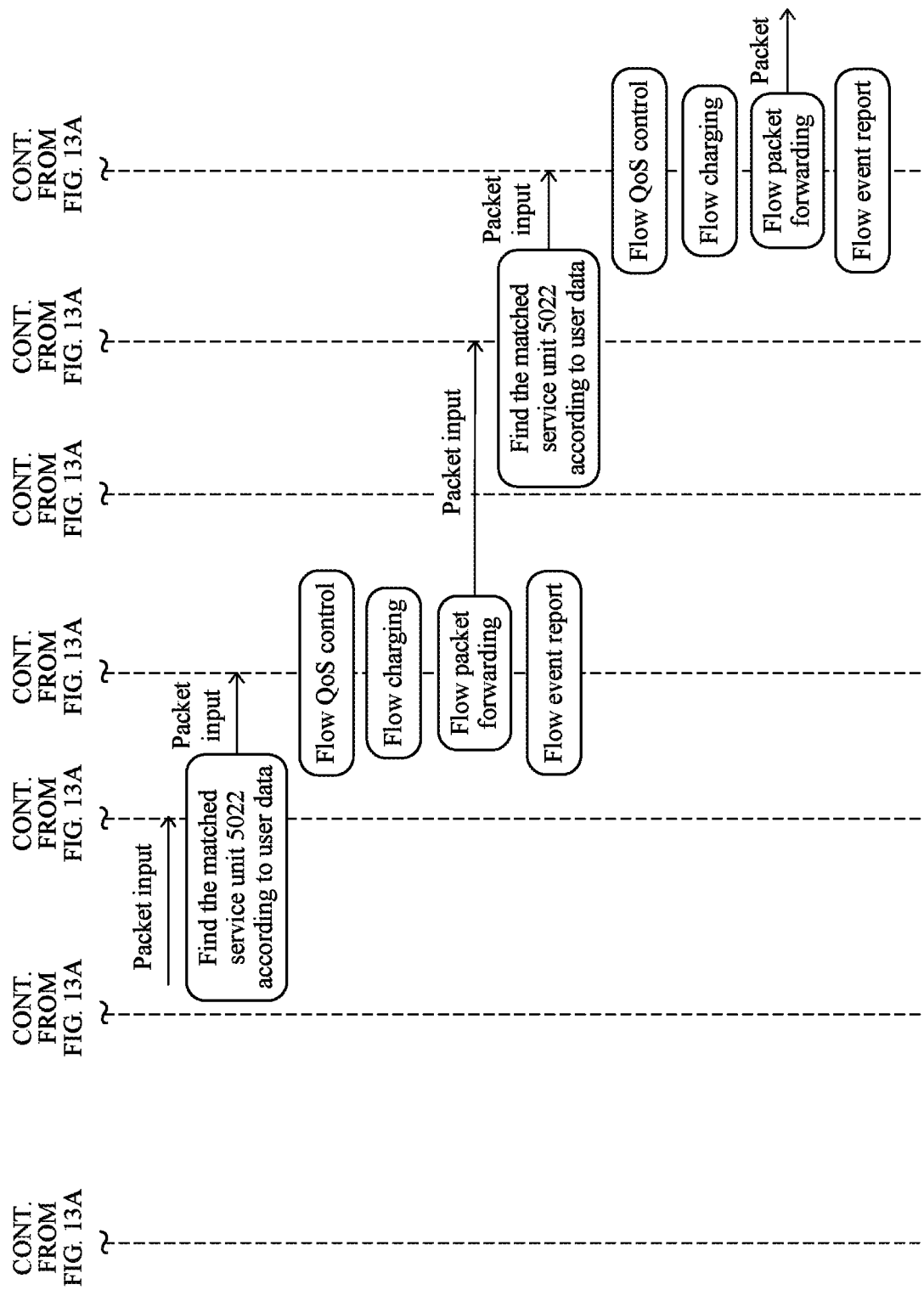

The following describes, with reference to FIG. 12, FIG. 13A, and FIG. 13B, optional procedures of controlling, by a GW-C 501, a GW-U 502 to establish a service unit.

Before a GW-U 502 performs processing for user data of a terminal, a service unit 5022 first needs to be added for the terminal. FIG. 12 shows an optional procedure of controlling, by a GW-C 501, a GW-U 502 to add a service unit.

Referring to FIG. 12, in an example, the GW-U 502 receives a create session request. A request for adding/modifying a service unit 5022 in step S1202 of FIG. 12 is the aforementioned first request message. Herein, in an example, the user data is packet data.

The procedure shown in FIG. 12 includes the following steps.

S1201: The GW-C 501 receives a connection establishment message sent by another network element. A create session request sent by an MME or an S-GW is used as an example herein.

Optionally, in step S1201, the connection establishment message may be a create session request message sent by an MME or an S-GW. The message is used to request to create a session and a bearer. The message may include user plane GTP tunnel information.

Alternatively, the connection establishment message may be a create bearer response message in a dedicated bearer establishment procedure triggered by the GW-C 501 or a PCRF. The message may include user plane GTP tunnel information of a peer-end network element, for example, GTP tunnel information of a connection between a peer-end network element and a user plane.

Alternatively, the connection establishment message may be a multimedia information provider binding update (MIP BU) message sent by a terminal or an access gateway. The message may include mobile IP information, which may be MIPv4, proxy MIP (PMIP) v6, dual stack MIP (DSMIP) v6, or other information. The access gateway includes but is not limited to an evolved packet data gateway (ePDG), a high rate packet data serving gateway (HSGW) in a code division multiple access (CDMA) system, and an access router of a WiFi/wireless local area network (WLAN).

S1202: The GW-C 501 sends, to the GW-U 502, a request for adding/modifying a service unit 5022 (Add/modify Module Request), that is, the aforementioned first request message, where the first request message is used to request to add/modify a session unit and a bearer unit, the added/modified service unit 5022 is configured to process and forward user data of a terminal, and the first request message includes service unit configuration information of the added/modified service unit 5022.

S1203: An interface management unit 5021 in the GW-U 502 adds/modifies the service unit 5022 (for example, the session unit and the bearer unit).

S1204: The interface management unit 5021 in the GW-U 502 returns a response message for adding/modifying the service unit 5022, where the message may carry a cause value for representing whether the service unit 5022 is successfully added or not.

S1205: After receiving the response message, the GW-C 501 may return a create session response to another network element.

If the service unit 5022 is successfully added, for example, the session unit and bearer unit are successfully added, the added session unit and bearer unit start processing the user data of the terminal.

For example, the session unit receives the user data such as packet data. The session unit determines, according to service data information in the user data, another service unit configured to process the user data. Herein, the another service unit determined by the session unit includes the bearer unit in FIG. 12. The session unit sends the user data to the bearer unit for processing. The bearer unit performs bearer QoS control, bearer charging, and the like on the received user data, and forwards user data, for example, forwards a bearer packet in FIG. 12. Optionally, after forwarding the user data, the bearer unit may further report a bearer event report, to report a service data forwarding status, for example, a success or a failure, a charging event, and a service event.

Optionally, if in step S1201, the GW-C 501 receives the create session request or MIP binding update message, in step S1202, the service unit 5022 that the GW-C 501 requests the GW-U 502 to add may include the session unit and the bearer unit. If only the bearer unit is to be established, the GW-C 501 may request to add only the bearer unit, and request the GW-U 502 to modify bearer unit matching information in service data information in the session unit, that is, the aforementioned tunnel information in the service data information, so that after receiving corresponding user data subsequently, the session unit can forward the received user data to a corresponding bearer unit.

Optionally, if in step S1201, the GW-C 501 receives the create bearer response message in the dedicated bearer establishment procedure triggered by the GW-C 501 or the PCRF, in step S1202, the GW-C 501 may further request the GW-U 502 to add a service flow unit, which is configured to forward and process user data matching a service flow policy and rule. The service flow policy and rule may include the aforementioned IP 5-tuple information. The GW-C 501 may generate service unit configuration information of the service flow unit according to the service flow policy and rule, and modify service flow unit matching information in service data information in the session unit, that is, the aforementioned IP 5-tuple information in the service flow unit, so that after receiving corresponding user data subsequently, the session unit can forward the received user data to a corresponding service flow unit. The GW-C 501 may receive the service flow policy and rule from the PCRF, or obtain the service flow policy and rule from a PCC rule configured by the GW-C 501.

Optionally, the GW-C 501 may alternatively request, based on a default service flow policy and rule configured by the GW-C 501, the GW-U 502 to add a service flow unit, to process and forward corresponding user data (for example, service flow data).

Optionally, if the GW-C 501 requests the GW-U 502 to add the service flow unit, and the GW-U 502 already has a corresponding session unit, the GW-C 501 further needs to request the GW-U 502 to modify service data information in service unit configuration information of the session unit. In this case, the service data information is saved in the service unit configuration information of the session unit. In this way, after receiving user data (for example, service flow data, that is, user data belonging to a service flow) subsequently, the session unit can forward the user data to a corresponding service flow unit for processing and forwarding.

Optionally, in step S1202, in a bearer establishment process, the GW-C 501 may alternatively request, based on a default content policy and rule configured by the GW-C 501, the GW-U 502 to add a content unit, to process and forward corresponding user data (for example, content data, that is, data belonging to content). The GW-U 502 generates content unit information according to the content policy and rule information. Further, if the GW-C 501 requests the GW-U 502 to add the content unit, and the GW-U 502 already has a corresponding session unit, the GW-C 501 further needs to request the GW-U 502 to modify content unit matching information in service data information in service unit configuration information of the session unit, that is, the aforementioned content information, so that after receiving user data (for example, content data) subsequently, the session unit can forward the user data to a corresponding content unit for processing and forwarding.

Optionally, in step S1202, the first request message sent by the GW-C 501 to the GW-U 502 may include the service unit configuration information of the service unit 5022. For example, for a session unit, a data matching function and a list of service units matching session data may be included.

Optionally, in step S1202, further, if a session unit is to be newly established, the GW-C 501 needs to assign an IP address to the terminal.

In step S1203, the GW-U 502 may add the service unit 5022 according to the service unit configuration information in the first request message sent by the GW-C 501. For the service unit configuration information, refer to descriptions in Table 1. Details are not further described herein.

In addition, in another embodiment, sending the first request message to the GW-U 502 by the GW-C 501 is not triggered by a connection establishment message received from another network element. An optional implementation includes: After receiving user data, the session unit in the GW-U 502 parses the user data to obtain service flow-related information or content-related information, that is, detects a new service flow or new content. The session unit reports this event to the gateway control plane GW-C 501. Thus, in step S1202, the GW-C 501 requests the GW-U 502 to add the service flow unit or the content unit, and to modify the service unit configuration information in the session unit, and optionally, to modify service flow unit matching information or content unit matching information in the service unit configuration information.

In the procedure in FIG. 12, a GW-C performs a configuration operation, such as adding, modification, or deletion, on a service unit of a GW-U, so that service units in the GW-U can be flexibly combined. Different from that in an existing network, this can avoid frequently changing the GW-U, and the GW-U does not always need to be modified each time service function logic is added. In this way, user data can be flexibly processed according to a service requirement of the user data. For example, a service unit can be flexibly added or removed in a process of processing the user data, so that the GW-U is able to adapt to a future new service type of user data.

After the GW-C completes configuring the GW-U, the GW-U can independently process the user data without interacting with the GW-C. This decreases coupling between the GW-U and the GW-C and reduces signaling overheads, and also decreases coupling between service units in the GW-U.

Based on the procedure shown in FIG. 12, a procedure of controlling, by a GW-C 501, a GW-U 502 to add a service unit 5022 shown in FIG. 13A and FIG. 13B includes: a procedure of requesting, by the GW-C 501, to add a service unit 5022 in a local GW-U 502 and requesting, by the GW-C 501, to add a service unit 5022 in an anchor GW-U 502.

The GW-C 501 may determine whether user data passes through the GW-U used as a mobile anchor, in multiple manners including the following two:

Manner 1: The GW-C 501 performs determining according to a service type of the user data.

Manner 2: The GW-C 501 performs determining according to a policy and rule delivered by a policy and charging rules function (PCRF).

For the manner 1, as the foregoing mobile anchor can keep a characteristic of mobile service continuity, for different service types, whether the user data passes through an anchor gateway is determined. Optionally, the service types may be divided into:

a service type of the mobile anchor that is needed for transmitting the user data, or a service type of the mobile anchor that is not needed for transmitting the user data.

Referring to FIG. 5, communication service types such as voice communication and a video call are used as an example. For example, for session service types such as Skype, IMS, QQ, WeChat, VoIP, and a video call, or interaction service types such as shooting, an instant strategy, real-time interaction, and other network service types, service continuity needs to be ensured when a terminal moves.

This type of service requires that the terminal has an unchanged IP address in a moving process, so as to ensure service continuity and avoid interrupting a voice and video call service. For this type of service, the GW-U 502 may be set as a mobile anchor, so as to keep the IP address of the terminal unchanged in a moving process, and avoid interrupting a voice and video call service.

For another example, for best effort network service types, such as web page browsing, video buffering, and peer to peer (P2P) download, this type of service does not have a high requirement on continuity, and therefore, a mobile anchor may not be set. User data of this type of service may be directly transmitted to Internet without passing through a mobile anchor. This reduces a delay and an alternative route, and improves transmission efficiency and user experience.

For the manner 2, the GW-C 501 initiates a credit control request (CCR) to the PCRF, and the CCR is used to request the policy and rule. The GW-C 501 obtains an IP 5-tuple from the policy and rule received from the PCRF; if an IP address in the obtained IP 5-tuple (for example, a source IP address or a destination IP address, or a source IP address and a destination IP address) is in an IP address segment of an anchor GW-U, determines that the user data needs to pass through the anchor gateway; or if an IP address in the obtained IP 5-tuple is in an IP address segment of a local GW-U, determines that the user data needs to pass through the local GW-U.

The IP 5-tuple includes a source IP address, a source port number, a destination IP address, a destination port number, and a transport layer protocol.

The procedure shown in FIG. 13A and FIG. 13B is applicable to a scenario in which the GW-C 501 determines that the user data needs to pass through the GW-U 502 used as a mobile anchor, and specifically includes the following steps.

S1301: The GW-C 501 receives a connection establishment message sent by another network element.

S1302: The GW-C 501 requests a local GW-U 502 to add/modify a service unit 5022.

S1303: The local GW-U 502 installs a new service unit 5022 or modifies an existing service unit 5022, for example, a session unit and a service flow unit.

S1304: The local GW-U 502 returns a response to service unit 5022 adding/modification, where the message carries a cause value representing a success or a failure.

S1305: The GW-C 501 requests an anchor GW-U 502 to add/modify a service unit 5022.

In steps S1302 and S1305, a request message for adding/modifying a service unit includes service unit configuration information of the added/modified service unit 5022. Different from that in the procedure shown in FIG. 12, the service unit configuration information further includes related information about forwarding of the user data between the local GW-U 502 and the anchor GW-U 502.

S1306: The anchor GW-U 502 installs a new service unit 5022 or modifies an existing service unit 5022, for example, a session unit and a service flow unit.

S1307: The anchor GW-U 502 returns a response to service unit 5022 adding/modification, where the message carries a cause value representing a success or a failure.

S1308: After receiving the response sent by the local GW-U 502 and the response sent by the anchor GW-U 502, the GW-C 501 may return a connection establishment response message to another network element, for example, a PCC re-authorization answer (RAA) message.

Optionally, for the connection establishment message in step S1301, refer to the descriptions about the connection establishment message in FIG. 12. In addition, the connection establishment message in step S1301 may alternatively be a policy and charging control (PCC) re-authorization request (RAR)/credit control answer (CCA) message sent by a PCRF. The CCA message may be sent by the PCRF in response to the CCR sent by the GW-C 501. The RAR message may request to add a service flow for a user, and generally includes an IP 5-tuple.

Alternatively, optionally, the connection establishment message in step S1301 may be triggered by reporting a new user service event to the GW-C 501 when a service module in the local GW-U 502 detects a service flow and content service passing through an anchor that is newly initiated by a user terminal or a network side. Thus, the GW-C 501 initiates an action of adding a service unit and modifying/updating a service unit on the anchor GW-U 502 and the local GW-U 502. For example, after receiving user data, a session unit in the GW-U 502 parses the user data to obtain service flow-related information or content-related information, that is, detects a new service flow or new content. The session unit reports this event to the gateway control plane GW-C 501. In step S1302 or step S1305, the GW-C 501 requests the GW-U 502 to add the service flow unit or the content unit, and to modify the service unit configuration information in the session unit, and optionally, to modify service flow unit matching information or content unit matching information in the service unit configuration information.

Optionally, before step S1301, after receiving a create session request or MIP binding update message, the GW-C 501 may send the CCR to the PCRF, to request the policy and rule. The policy and rule delivered by the PCRF may include information used for indicating an anchor that the user data of the terminal needs to pass through when being forwarded, and the information may be, for example, an IP 5-tuple of a service flow or an identifier of an IP 5-tuple of a service flow.

Optionally, before step S1301, the GW-C 501 may obtain information about the terminal according to the policy and rule obtained from the PCRF or a signing rule (for example, based on signing information of an APN of the terminal or a policy and rule requirement obtained from the PCRF, an APN service needs to pass through the anchor GW-U 502, and another APN service does not need to pass through the anchor GW-U 502), assign two IP addresses to the terminal. One IP address is used when the local GW-U 502 forwards user data between a packet data network and the terminal, and the other IP address is used when the anchor GW-U 502 forwards service data passing through the anchor GW-U 502.

Optionally, in step S1302, a first request message sent by the GW-C 501 to the local GW-U 502 may carry a service flow data forwarding table in Table 1. The service flow unit sets a next-hop address of uplink user data (for example, service flow data) as information of the anchor GW-U 502 (for example, address information or tunnel information of the anchor GW-U 502). The information is, for example, at least one of the following information: an IP address of the anchor GW-U 502, an IP address of a terminal corresponding to the anchor GW-U 502 (the IP address may be used for IP address translation, which may use a technology such as network address translation (NAT)), a bearer TEID of the terminal (the identifier may be used for a GTP interface protocol), or a port number used in terminal service NAT (the port number is a port number of a NAT gateway, associated with an IP address of the terminal, and may be used for IP address translation, which may use a technology such as NAT).

Optionally, in step S1305, a first request message sent by the GW-C 501 to the anchor GW-U 502 may also carry a service flow data forwarding table in Table 1. A service flow unit in the anchor GW-U 502 sets a next-hop address of downlink user data (for example, service flow data) as information of the local GW-U 502. The information is, for example, at least one of the following information: an IP address of the local GW-U 502, an IP address of a terminal corresponding to the local GW-U 502 (the IP address may be used for IP address translation, which may use a technology such as NAT), a bearer TEID of the terminal (the identifier may be used for a GTP interface protocol), or a port number (the port number is a port number of a NAT gateway, associated with an IP address of the terminal, and may be used for IP address translation, which may use a technology such as NAT).

Optionally, in step S1302 or step S1305, further, the GW-C 501 may alternatively request, based on a default service flow policy and rule configured by the GW-C 501, the anchor GW-U 502 and the local GW-U 502 to separately add a service flow unit, to process and forward corresponding service flow data.

Optionally, if in step S1302 or step S1305, the GW-C 501 requests the anchor GW-U 502 and the local GW-U 502 to separately add a service flow unit, and the anchor GW-U 502 and the local GW-U 502 each already have a corresponding session unit, the GW-C 501 further needs to request the GW-U 502 to modify or update service data information in service unit configuration information of each session unit. In this case, the service data information is saved in the service unit configuration information of each session unit. In this way, after receiving user data (for example, service flow data, that is, user data belonging to a service flow) subsequently, the session unit can forward the user data to a corresponding service flow unit for processing and forwarding.

In step S1302 or step S1305, the first request message sent by the GW-C 501 to the anchor GW-U 502 and the local GW-U 502 may further include service unit configuration information of the service unit 5022. For example, for a session unit, a data matching function, a list of service units matching session data, and the like may be included.

In step S1303 or step S1306, the GW-U 502 may add the service unit 5022 according to the service unit configuration information in the first request message sent by the GW-C 501.

After steps S1301 to S1308 are performed, the session units and service flow units added by the local GW-U 502 and the anchor GW-U 502 start processing user data. For uplink user data, the local GW-U 502 forwards user data to the anchor GW-U 502. For downlink user data, the anchor GW-U 502 forwards user data to the local GW-U 502.

In the procedure shown in FIG. 13A and FIG. 13B, when configuring the service unit in the GW-U 502, the GW-C 501 adds user data forwarding information to the service unit configuration information, and configures the service unit configuration information for the service unit. The user data forwarding information is used to indicate whether the service unit sends the processed user data to another GW-U 502 used as a mobile anchor, or forwards the processed user data to a PDN. The user data forwarding information is used, so that user data that does not need to be processed by the mobile anchor directly enters the PDN. This reduces processing load of the mobile anchor and reduces a delay of transmitting the user data.

Whether the user data is processed by the mobile anchor may be determined according to a service type of the user data. User data that ensures service continuity is sent to the mobile anchor for processing, so as to ensure service continuity when the terminal moves.

Figure 14:
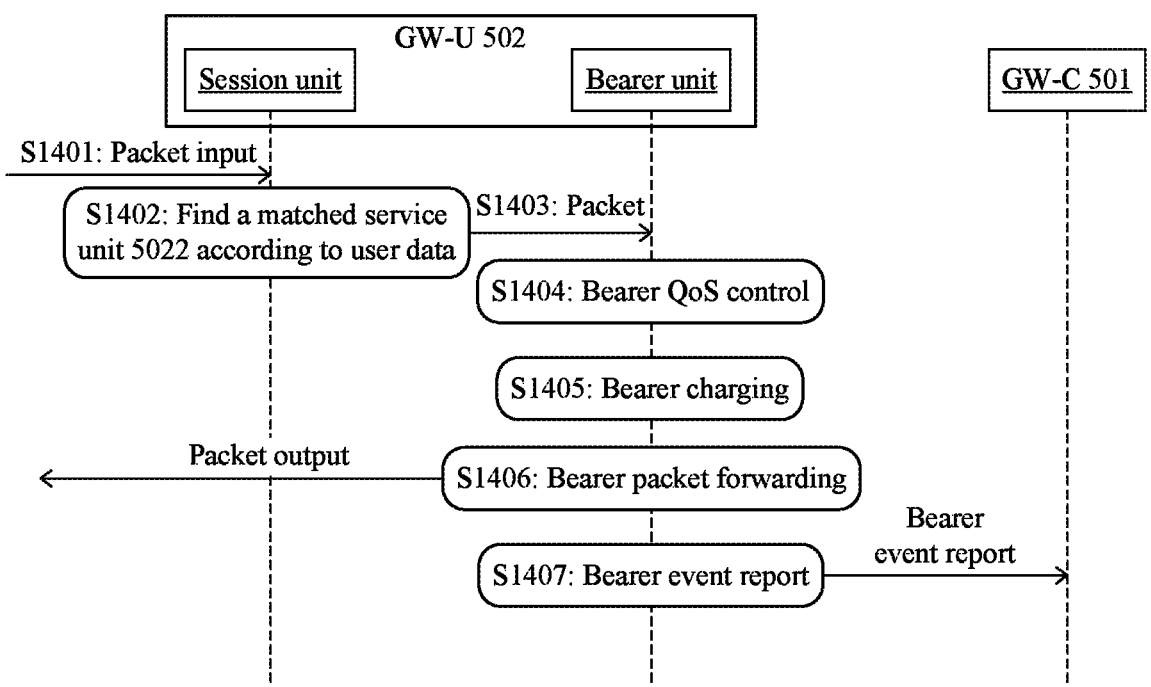
FIG. 14 to FIG. 19 are schematic diagrams of an optional procedure of processing user data by a GW-U according to an embodiment of the present disclosure.

The following describes, with reference to FIG. 14 to FIG. 19, optional implementation solutions of processing the user data by the GW-U 502. In FIG. 14, a session unit and a bearer unit in the GW-U 502 are configured to process the user data.

A procedure shown in FIG. 14 may include the following steps.

S1401: The session unit receives packet data.

The session unit receives packet data sent by another network element, for example, an evolved NodeB (eNodeB), an Internet server, an S-GW, a P-GW, an ePDG; or an HSGW.

An interface management unit 5021 in the GW-U 502 may find a corresponding matched session unit, based on one or more pieces of service data information in the packet data. Service data information of the session unit may be configured by a GW-C 501.

S1402: The session unit finds a matched service unit 5022 according to packet data that is used as user data, that is, a bearer unit in FIG. 14; for example, obtains tunnel information from a packet, performs matching between the tunnel information and that in saved service data information, to determine the bearer unit configured to process the packet data; and the session unit may add the service data information (for example, the aforementioned meta data) to the packet data and sends the packet data to the determined bearer unit.

S1403: The session unit forwards the packet data to the matched bearer unit.

S1404: The bearer unit performs bearer QoS control on the packet data.

S1405: The bearer unit performs bearer charging on the packet data.

S1406: The bearer unit forwards a bearer packet, to output the packet data.

The bearer unit may forward the packet data, based on the meta data in the packet data or service unit configuration information of the bearer unit that is configured when the GW-C 501 adds/modifies the bearer unit.

For example, the bearer unit may forward the packet data to a next service unit 5022 or to another network element, for example, an anchor GW-U 502, an eNodeB, or a PDN, according to the service unit configuration information (for example, a bearer data forwarding table in Table 1) configured when the GW-C 501 adds/modifies the bearer unit.

The GW-C 501 determines, according to the service unit configuration information (for example, the bearer data forwarding table in Table 1) configured when the bearer unit is added/modified, whether to forward uplink user data to an anchor GW-U 502 or to forward uplink user data to a PDN.

S1407: The bearer unit reports a bearer event report to a GW-C 501.

The bearer unit may perform one or more of step S1404, step S1405, or step S1407. A specific step performed by the bearer unit, that is, a function of the bearer unit, may be configured in the service unit configuration information of the bearer unit when the GW-C 501 adds/modifies the bearer unit. Refer to the third column of Table 1.

The user data may be forwarded, based on a bearer, to the anchor GW-U 502 or the PDN, for example, the Internet, and a service unit 5022 may be flexibly added or removed in a procedure of processing the user data, so that the GW-U 502 is able to adapt to a future new service type of user data.

Figure 15:
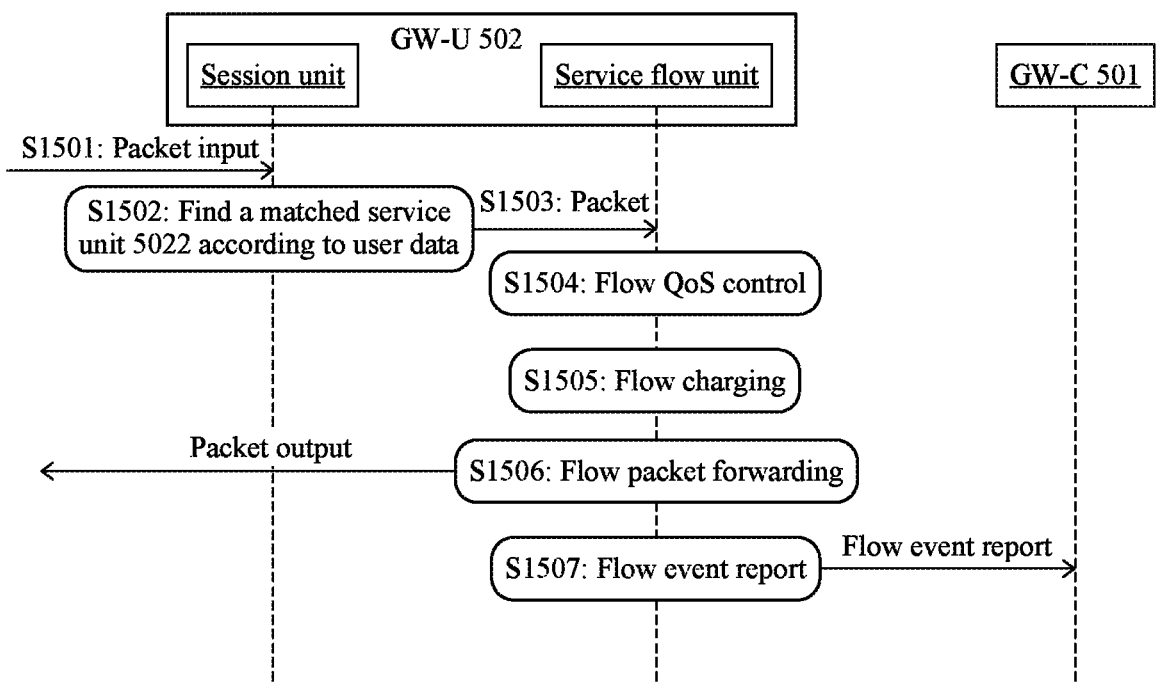

FIG. 15 shows an optional implementation solution of processing user data by a GW-U 502. In FIG. 15, a session unit and a service flow unit in the GW-U 502 are configured to process the user data.

A procedure shown in FIG. 15 may include the following steps.

S1501: The session unit receives packet data.

The session unit receives packet data sent by another network element, for example, an evolved NodeB (eNodeB), an Internet server, an S-GW, a P-GW, an ePDGc or an HSGW.

S1502: The session unit finds a matched service unit 5022 according to packet data that is used as user data, that is, a service flow unit in FIG. 15; for example, obtains IP 5-tuple information from a packet, performs matching between the IP 5-tuple information and that in saved service data information, to determine the service flow unit configured to process the packet data; and the session unit adds the service data information (for example, the aforementioned meta data) to the packet data and sends the packet data to the determined service flow unit.

S1503: The session unit forwards the packet data to the matched service flow unit.

S1504: The service flow unit performs service flow QoS control on the packet data.

S1505: The service flow unit performs flow charging on the packet data.

S1506: The service flow unit forwards a flow packet, to output the packet data.

The service flow unit may forward the packet data, based on the meta data in the packet data or service unit configuration information of the service flow unit that is configured when a GW-C 501 adds/modifies the service flow unit.

For example, the service flow unit may forward the packet to a next service unit 5022 or to another network element, for example, an anchor GW-U 502, an eNodeB, or a PDN according to the service unit configuration information (for example, a service flow data forwarding table in Table 1) configured when the GW-C 501 adds/modifies the service flow unit.

Whether uplink user data is forwarded to an anchor GW-U or a PDN is specified in the service unit configuration information (for example, the service flow data forwarding table in Table 1) configured when the GW-C 501 adds/modifies the service flow unit.

For another example, the service flow unit may alternatively forward the packet to a next service unit 5022 according to a list of service units 5022 in the meta data. The meta data is also forwarded to the next service unit 5022 together with the packet.

S1507: The service flow unit reports a flow event report to a GW-C 501.

The service flow unit may perform one or more of step S1504, step S1505, or step S1507. A specific step performed by the service flow unit, that is, a function of the service flow unit, may be configured in the service unit configuration information of the service flow unit when the GW-C 501 adds/modifies the service flow unit. Refer to the third column of Table 1.

Using the procedure shown in FIG. 15 can implement forwarding, in different manners, of different user data based on user service flow data. For example, service flows of a session service type or an interaction service type can be forwarded to the anchor GW-U 502, so as to ensure service continuity when a terminal moves. Service flows of a download service type, such as, an Internet download service type, can be directly forwarded to the Internet without passing through the anchor GW-U 502.

Figure 16:
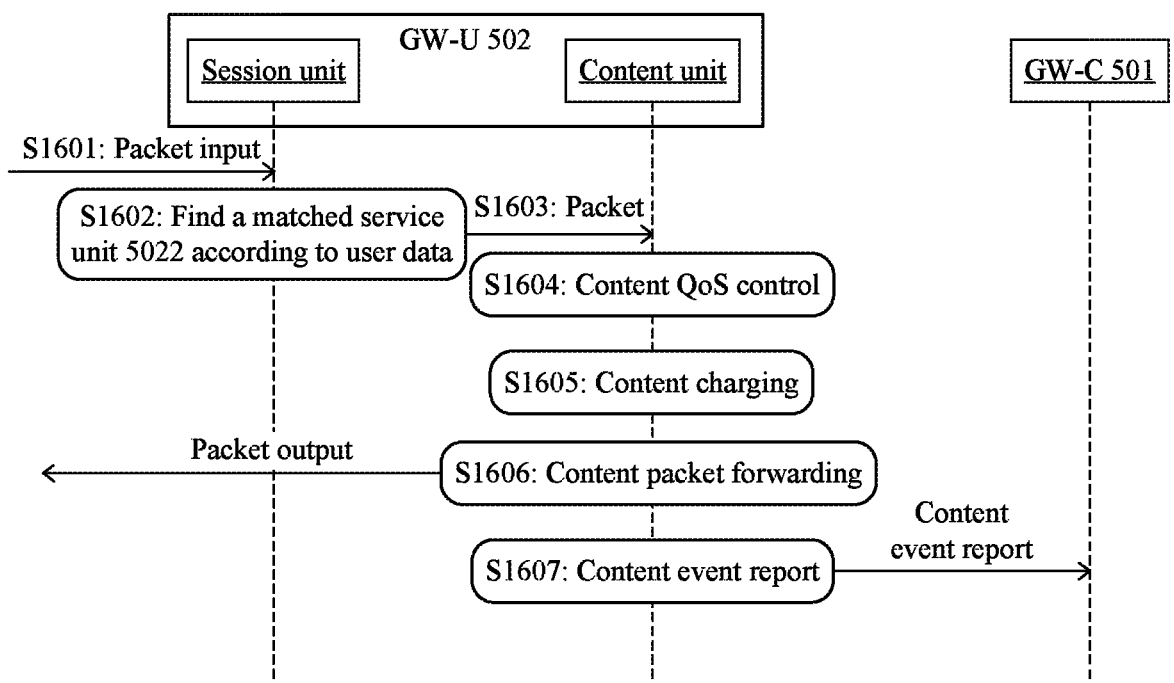

FIG. 16 shows a procedure of an optional implementation solution of processing the user data by the GW-U 502. A session unit and a content unit in the GW-U 502 are configured to process the user data.

As shown in FIG. 16, the procedure may include the following steps.

S1601: The session unit receives packet data.

The session unit receives packet data sent by another network element, for example, an eNodeB, an Internet server, an S-GW, a P-GW, an ePDG, or an HSGW.

S1602: The session unit finds a matched service unit 5022 according to packet data that is used as user data, that is, a content unit in FIG. 16; for example, obtains content information from the packet data, performs matching between the content information and that in saved service data information, to determine the content unit configured to process the packet data; and the session unit adds the service data information (for example, the aforementioned meta data) to the packet data and sends the packet data to the determined content unit.

S1603: The session unit forwards the packet data to the matched content unit.

S1604: The content unit performs content QoS control on the packet data.

S1605: The content unit performs content charging on the packet data.

S1606: The content unit forwards a content packet, to output the packet data.

The content unit may forward the packet data, based on the meta data in the packet or service unit configuration information configured when the GW-C 501 adds/modifies the content unit.

For example, the content unit may forward the packet data to a next service unit 5022 or to another network element, for example, an anchor GW-U 502, an eNodeB, or a PDN, according to the service unit configuration information (for example, a content data forwarding table in Table 1, and the content data forwarding table includes an address or tunnel information of the next-hop service unit 5022 or the next-hop another network element) configured when the GW-C 501 adds/modifies the content unit.

Whether uplink user data is forwarded to an anchor GW-U or a PDN is specified in the service unit configuration information (for example, the content data forwarding table in Table 1) configured when the GW-C 501 adds/modifies the content unit.

For another example, the content unit may alternatively forward the packet to a next service unit 5022 according to a list of service units 5022 in the meta data. The meta data is also forwarded to the next service unit 5022 together with the packet.

S1607: The content unit reports a content event report to a GW-C 501.

The content unit may perform one or more of step S1604, step S1605, or step S1607. A specific step performed by the content unit, that is, a function of the content unit, may be configured in the service unit configuration information of the content unit when the GW-C 501 adds/modifies the content unit. Refer to the third column of Table 1.

Using the procedure shown in FIG. 16 can implement forwarding, in different manners, of different user data based on user content data. For example, user data of a session service type or an interaction service type can be forwarded to the anchor GW-U 502, so as to ensure service continuity when a terminal moves. User data of a download service type, such as, an Internet download service type, can be directly forwarded to the Internet without passing through the anchor GW-U 502.

Figure 17:
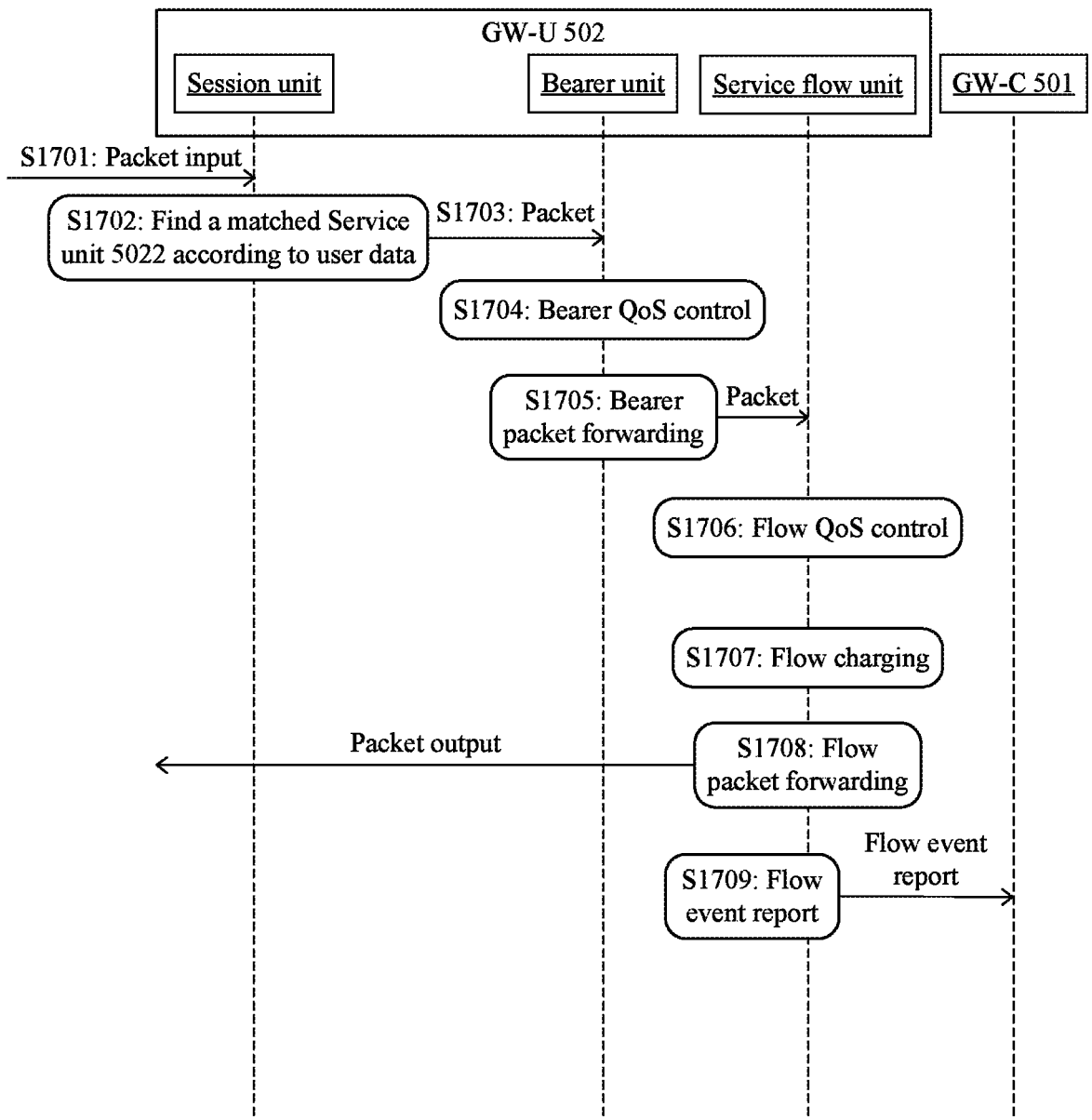

FIG. 17 shows an optional implementation solution of processing user data by a GW-U 502. A session unit, a bearer unit, and a service flow unit in the GW-U 502 are configured to process the user data.

A procedure shown in FIG. 17 may include the following steps.

For steps S1701 to S1704, refer to steps S1401 to S1404, respectively.

The bearer unit may be based on a service requirement of the user data and service unit configuration information configured when the GW-C 501 adds/modifies the bearer unit.

S1705: The bearer unit may forward the packet data to the service flow unit.

S1706: The service flow unit performs flow QoS control on the packet data.

S1707: The service flow unit performs flow charging on the packet data.

S1708: The service flow unit forwards a flow packet, to output the packet data.

The service flow unit forwards the packet data, based on meta data in the packet data or service unit configuration information of the service flow unit that is configured when the GW-C 501 adds/modifies the service flow unit.

For example, the service flow unit may forward the packet data to a next service unit 5022 or to another network element, for example, an anchor GW-U 502, an eNodeB, or a PDN, according to the service unit configuration information (for example, a service flow data forwarding table in Table 1) configured when the GW-C 501 adds/modifies the service flow unit.

Whether uplink user data is forwarded to an anchor GW-U or a PDN is specified in the service unit configuration information (for example, the service flow data forwarding table in Table 1) configured when the GW-C 501 adds/modifies the service flow unit.

For example, the service flow unit may alternatively forward the packet to a next service unit 5022 according to a list of service units 5022 in the meta data. The meta data is also forwarded to the next service unit 5022 together with the packet data.

Whether uplink user data is forwarded to an anchor GW-U or a PDN is specified in the service unit configuration information (for example, the service flow data forwarding table in Table 1) configured when the GW-C 501 adds/modifies the service flow unit.

S1709: The service flow unit reports a flow event report to a GW-C 501.

The service flow unit may perform one or more of step S1706, step S1707, or step S1709. A specific step performed by the service flow unit, that is, a function of the service flow unit, may be configured in the service unit configuration information of the service flow unit when the GW-C 501 adds/modifies the service flow unit. Refer to the third column of Table 1.

In the procedure shown in FIG. 17, a performing sequence of the bearer unit and the service flow unit may be changeable. This does not affect service data processing. Using the procedure shown in FIG. 17 improves flexibility in user data processing.

Figure 18:
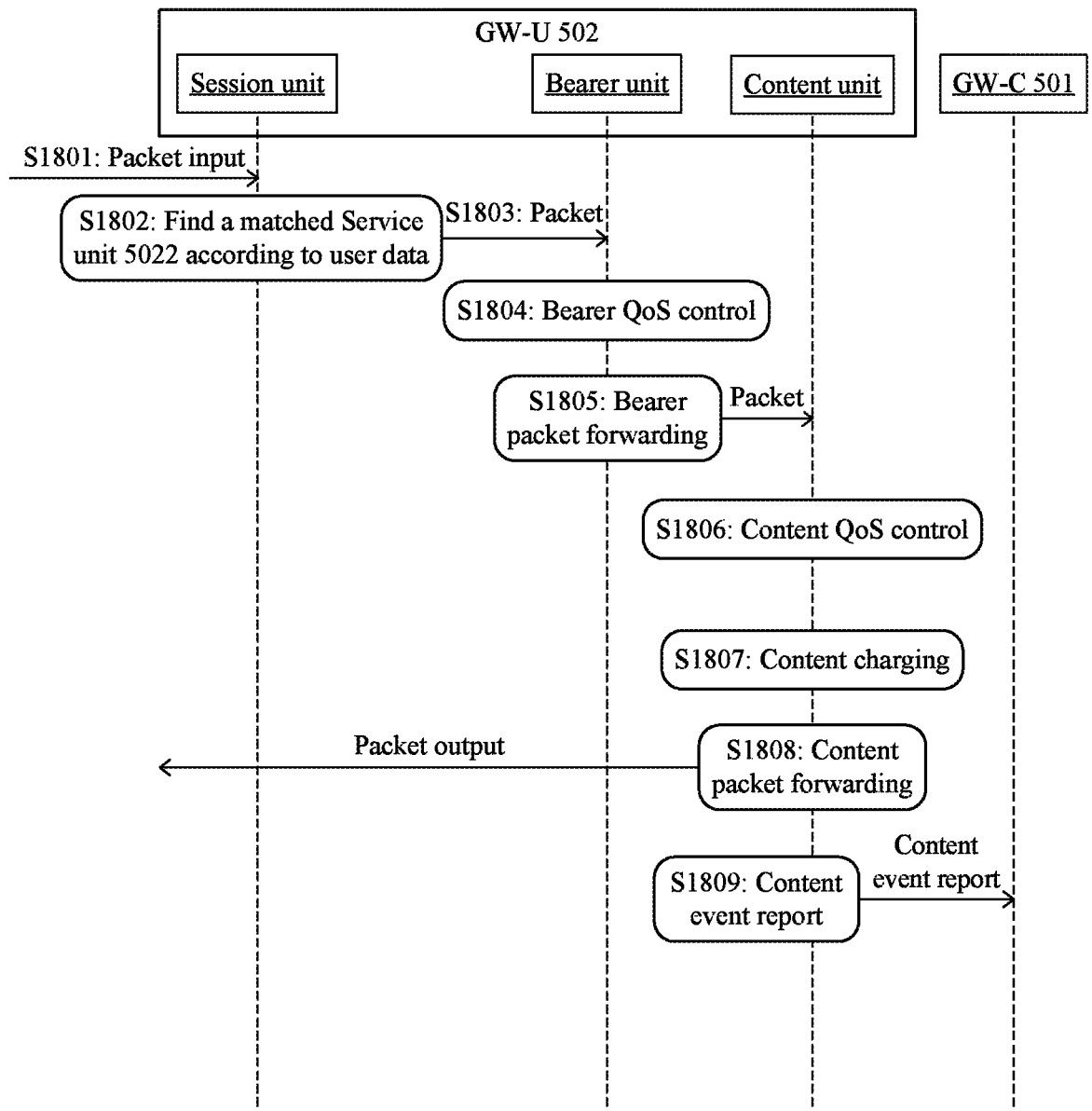

FIG. 18 shows a procedure of an optional implementation solution of processing user data by a GW-U 502. A session unit, a bearer unit, and a content unit in the GW-U 502 are configured to process the user data.

The procedure shown in FIG. 18 may include the following steps.

For steps S1801 to S1804, refer to steps S1401 to S1404, respectively.

Functions of the bearer unit, such as bearer charging and bearer event reporting, may be removed based on a service requirement of the user data, and service unit configuration information configured when the GW-C 501 adds/modifies the bearer unit.

S1805: The bearer unit forwards the packet data to the content unit.

S1806: The content unit performs content QoS control on the packet data.

S1807: The content unit performs content charging on the packet data.

S1808: The content unit forwards a content packet, to output the packet data.

The content unit may forward the packet data, based on meta data in the packet data or service unit configuration information of the content unit that is configured when the GW-C 501 adds/modifies the content unit.

For example, the content unit may forward the packet data to a next service unit 5022 or to another network element, for example, an anchor GW-U 502, an eNodeB, or a PDN, according to the service unit configuration information (for example, a content data forwarding table in Table 1, and the content data forwarding table includes an address or tunnel information of the next-hop service unit 5022 or the next-hop another network element) configured when the GW-C 501 adds/modifies the content unit.

Whether uplink user data is forwarded to an anchor GW-U or a PDN is specified in the service unit configuration information (for example, the content data forwarding table in Table 1) configured when the GW-C 501 adds/modifies the content unit.

For example, the content unit may alternatively forward the packet data to a next service unit 5022 according to a list of service units 5022 in the meta data. The meta data is also forwarded to the next service unit 5022 together with the packet.

Whether uplink user data is forwarded to an anchor GW-U or a PDN is specified in the service unit configuration information (for example, the content data forwarding table in Table 1) configured when the GW-C 501 adds/modifies the content unit.

S1809: The content unit reports a content event report to a GW-C 501.

The content unit may perform one or more of step S1806, step S1807, or step S1809. A specific step performed by the content unit, that is, a function of the content unit, may be configured in the service unit configuration information of the content unit when the GW-C 501 adds/modifies the content unit. Refer to the third column of Table 1.

In the procedure shown in FIG. 18, the bearer unit and the content unit may be arranged in a reverse order. This does not affect service data processing. Using the procedure shown in FIG. 18 improves flexibility in user data processing.

Figure 19:
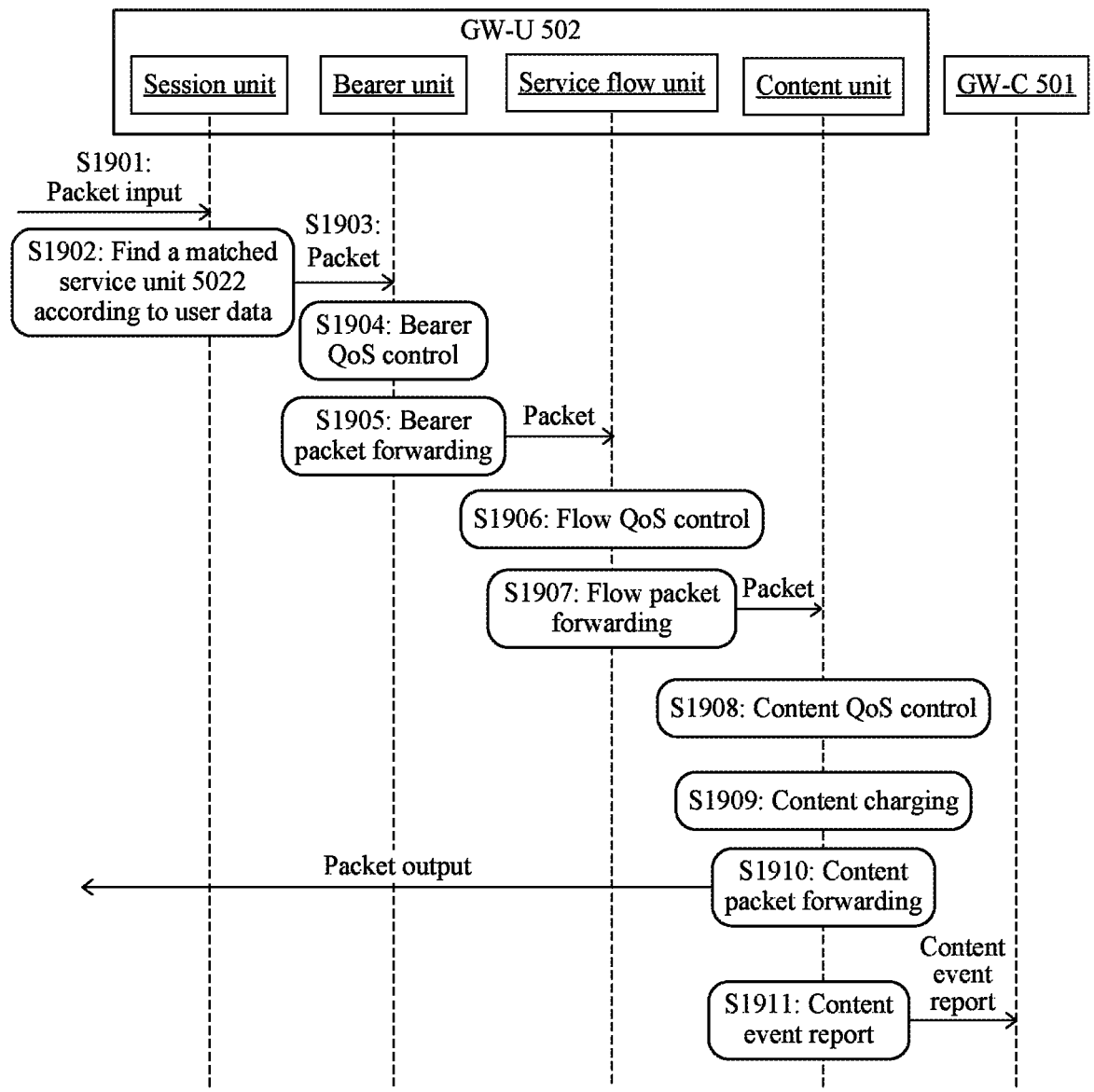

FIG. 19 shows a procedure of an optional implementation solution of processing user data by a GW-U 502. A session unit, a bearer unit, a service flow unit, and a content unit in the GW-U 502 are configured to process the user data.

The procedure shown in FIG. 19 may include the following steps.

For steps S1901 to S1906, refer to steps S1701 to S1706.

Functions of the bearer unit, such as bearer charging and bearer event reporting, may be removed based on a service requirement of the user data, and service unit configuration information configured when the GW-C 501 adds/modifies the bearer unit. Functions of the service flow unit, such as service flow charging and service flow event reporting, may be also removed based on a service requirement of the user data, and service unit configuration information configured when the GW-C 501 adds/modifies the service flow unit.

S1907: The service flow unit forwards the flow packet data to the content unit.

The service flow unit may forward the packet data, based on meta data in a packet or service unit configuration information configured when the GW-C 501 adds/modifies the service flow unit.

S1908: The content unit performs content QoS control on the packet data.

S1909: The content unit performs content charging on the packet data.

S1910: The content unit forwards a content packet, to output the packet data.

The content unit may forward the packet data, based on the meta data in the packet or service unit configuration information of the content unit that is configured when the GW-C 501 adds/modifies the content unit.

For example, the content unit may forward the packet to a next service unit 5022 or to another network element, for example, an anchor GW-U 502, an eNodeB, or a PDN, according to the service unit configuration information (for example, a content data forwarding table in Table 1) configured when the GW-C 501 adds/modifies the content unit.

Whether uplink user data is forwarded to an anchor GW-U or a PDN is specified in the service unit configuration information (for example, the content data forwarding table in Table 1) configured when the GW-C 501 adds/modifies the content unit.

For example, the content unit may alternatively forward the packet data to a next service unit 5022 according to a list of service units 5022 in the meta data. The meta data is also forwarded to the next service unit 5022 together with the packet.

Whether uplink user data is forwarded to an anchor GW-U or a PDN is specified in the service unit configuration information (for example, the content data forwarding table in Table 1) configured when the GW-C 501 adds/modifies the content unit.

S1911: The content unit reports a content event report.

The content unit may perform one or more of step S1908, step S1909, or step S1911. A specific step performed by the content unit, that is, a function of the content unit, may be configured in the service unit configuration information of the content unit when the GW-C 501 adds/modifies the content unit. Refer to the third column of Table 1.

In the procedure shown in FIG. 19, the bearer unit, the service flow unit, and the content unit may be arranged in a reverse order. This does not affect user data processing. Using the procedure shown in FIG. 19 improves flexibility in user data processing.

Figure 20:
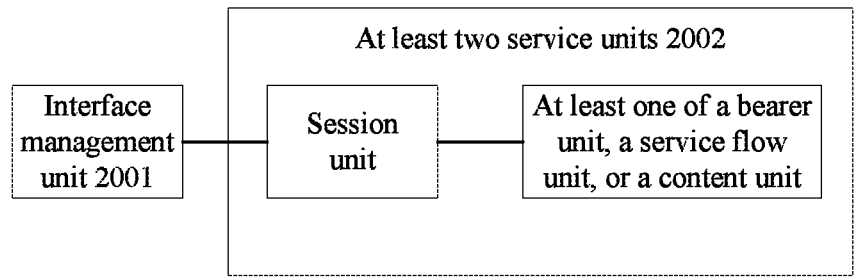
FIG. 20 is a schematic structural diagram of a user data processing apparatus according to an embodiment of the present disclosure.

FIG. 20 is a schematic structural diagram of a user data processing apparatus according to an embodiment of the present disclosure. As shown in FIG. 20, the apparatus includes:

an interface management unit 2001, configured to receive user data; and at least two service units 2002, configured to process the user data, where the at least two service units 2002 include a session unit and at least one of a bearer unit, a service flow unit, or a content unit; the session unit is configured to perform session processing, the bearer unit is configured to perform bearer processing, the service flow unit is configured to perform service flow processing, and the content unit is configured to perform content processing;

the interface management unit 2001 is further configured to determine the session unit configured to process the user data, and send the received user data to the determined session unit; and the session unit is further configured to determine another service unit 2002 configured to process the user data.

Optionally, the user data includes service data information, and the service data information is used to determine a service unit 2002 configured to process the user data.

The interface management unit 2001 is specifically configured to determine, according to the service data information, the session unit configured to process the user data.

The session unit is specifically configured to determine, according to the service data information, the another service unit 2002 configured to process the user data.

Optionally, the service data information includes:

an Internet Protocol IP address of a terminal to which the user data belongs, and at least one of tunnel information used to transmit the user data, IP 5-tuple information used to transmit the user data, or content information of the user data.

Optionally, the interface management unit 2001 is specifically configured to use a session unit associated with the IP address of the terminal to which the user data belongs, as the session unit configured to process the user data.

The session unit is specifically configured to: if the service data information includes the tunnel information, use a bearer unit associated with the tunnel information, as a bearer unit configured to process the user data; if the service data information includes the IP 5-tuple information, use a service flow unit associated with the IP 5-tuple information, as a service flow unit configured to process the user data; or if the service data information includes the content information, use a content unit associated with the content information, as a content unit configured to process the user data.

Optionally, the service unit 2002 is specifically configured to process the user data separately according to saved service unit configuration information.

The service unit configuration information includes information about an operation performed by the service unit 2002 and information about a parameter used by the service unit 2002 when the service unit 2002 processes the user data.

Optionally, the interface management unit 2001 is further configured to: before determining the session unit configured to process the user data, receive a first request message sent by a gateway control plane GW-C, where the first request message is used to add the service unit 2002, and the first request message includes the service data information and the service unit configuration information; add the service unit 2002, save the service data information and the service unit configuration information, save an association relationship between the added service unit 2002 and the service data information, and save an association relationship between the added service unit 2002 and the service unit configuration information; or receive a first request message sent by a gateway control plane GW-C, where the first request message is used to add the service unit 2002, and the first request message includes the service data information and identifier information of the service unit configuration information; add the service unit 2002, determine the service unit configuration information according to the identifier information of the service unit configuration information, save the service data information and the determined service unit configuration information, save an association relationship between the added service unit 2002 and the service data information, and save an association relationship between the added service unit 2002 and the service unit configuration information.

Optionally, the interface management unit 2001 is further configured to: before determining the session unit configured to process the user data, receive a first request message sent by a gateway control plane GW-C, where the first request message is used to add the service unit 2002 associated with the session unit configured to process the user data, the first request message includes identifier information of the session unit configured to process the user data, the service unit configuration information of the service unit 2002, and some items in the service data information, and the some items include at least one of the tunnel information, the IP 5-tuple, or the application layer identifier; add the service unit 2002, add the some items to the original service data information, save an association relationship between the session unit configured to process the user data and the service unit 2002, save the service data information to which the some items have been added and the service unit configuration information, save an association relationship between the added service unit 2002 and the service data information, and save an association relationship between the added service unit 2002 and the service unit configuration information; or receive a first request message sent by a gateway control plane GW-C, where the first request message is used to add the service unit 2002 associated with the session unit configured to process the user data, the first request message includes identifier information of the session unit configured to process the user data, identifier information of the service unit configuration information of the service unit 2002, and some items in the service data information, and the some items include at least one of the tunnel information, the IP 5-tuple, or the application layer identifier; add the service unit 2002, determine the service unit configuration information according to the identifier information of the service unit configuration information, add the some items to the original service data information, save an association relationship between the session unit configured to process the user data and the service unit 2002, save the service data information to which the some items have been added and the determined service unit configuration information, save an association relationship between the added service unit

2002 and the service data information, and save an association relationship between the added service unit 2002 and the service unit configuration information.

Optionally, the first request message further includes unit type information of the service unit 2002, and the unit type information includes a type identifier of the service unit 2002 or an identifier of a template used by the service unit 2002.

The interface management unit 2001 is specifically configured to:

determine, according to the unit type information of the service unit 2002, the service unit template used by the service unit 2002, and add the service unit 2002 based on the determined service unit template.

Optionally, the interface management unit 2001 is further configured to: before adding the service unit 2002 based on the determined service unit template, receive a second request message sent by the GW-C, where the second request message is used to request to add the service unit template; and add the service unit template after receiving the second request message.

Optionally, the first request message further includes processing order information, and the processing order information is used to indicate a processing order of the service unit 2002 that processes the user data.

The session unit is further configured to: after the user data is processed, send, according to the processing order indicated by the processing order information, the user data and the processing order information to a next-hop service unit 2002 indicated by the processing order, so that a subsequent service unit 2002 including the next-hop service unit 2002 processes the user data in the processing order.

Optionally, the GW-U is a local access gateway, and the user data is uplink user data.

The service unit configuration information further includes user data forwarding information, and the user data forwarding information is used to indicate:

after the service unit 2002 configured to process the user data completes processing the user data, whether to send the processed user data to another GW-U used as a mobile anchor, or to forward the processed user data to a packet data network PDN.

Optionally, the user data forwarding information is determined according to a service type of the user data.

Optionally, a gateway user plane GW-U in which the apparatus shown in FIG. 20 is located is a mobile anchor; or a gateway user plane GW-U in which the apparatus shown in FIG. 20 is located is a local access gateway.

Optionally, the interface management unit 2001 is specifically configured to add the service unit 2002 by creating a service context.

The service unit 2002 is specifically configured to process the user data according to the service context that is used when the interface management unit 2001 creates the service unit 2002.

If the service unit 2002 is a session unit, the service context is a session context.

If the service unit 2002 is a bearer unit, the service context is a bearer context.

If the service unit 2002 is a service flow unit, the service context is a service flow context.

If the service unit 2002 is a content unit, the service context is a content context.

For another optional manner of the apparatus shown in FIG. 20, refer to the aforementioned GW-U 502. For another optional implementation of the interface management unit 2001, refer to the aforementioned interface management unit 5021. For another optional implementation of the service unit 2002, refer to the aforementioned service unit 5022.

In the apparatus shown in FIG. 20, functions of receiving the user data and receiving the message in the interface management unit 2001 may be implemented by a receiver, and functions of sending the user data and sending the message may be implemented by a transmitter. Processing functions such as adding the service unit 2002 and determining the service unit 2002 in the interface management unit 2001 may be implemented by a processor. Optionally, the receiver, the processor, and the transmitter may be integrated into one or more chips for implementation.

Figure 21:
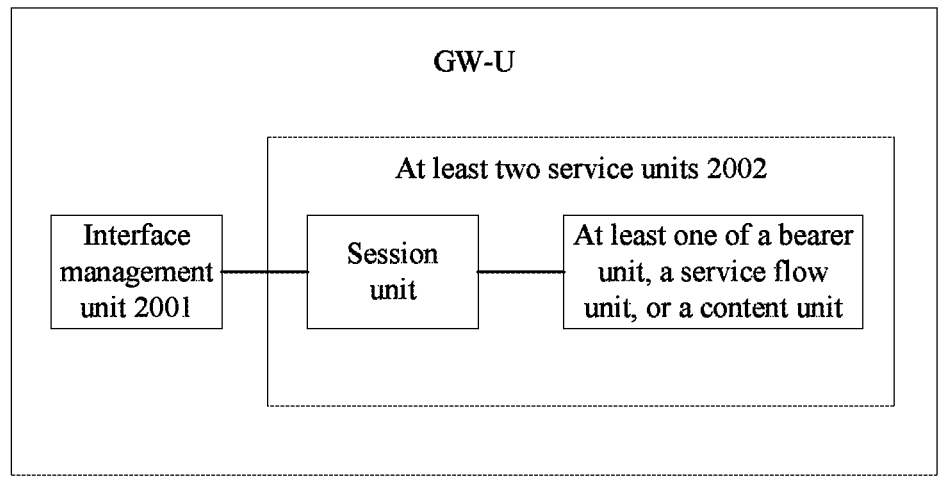
FIG. 21 is a schematic diagram of a GW-U according to an embodiment of the present disclosure.

FIG. 21 is a schematic diagram of a gateway user plane GW-U according to an embodiment of the present disclosure. As shown in FIG. 21, the GW-U includes the apparatus shown in FIG. 20. For another optional implementation of the GW-U, refer to the aforementioned GW-U 502.

Figure 22:
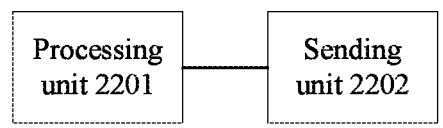
FIG. 22 is a schematic structural diagram of a gateway configuration apparatus according to an embodiment of the present disclosure.

FIG. 22 is a schematic structural diagram of a gateway configuration apparatus according to an embodiment of the present disclosure. As shown in FIG. 22, the apparatus includes:

a processing unit 2201, configured to determine that a service unit processing user data needs to be added to a gateway user plane GW-U; and a sending unit 2202, configured to send a first request message to the GW-U, where the first request message is used to request to add the service unit processing the user data to the GW-U.

The service unit processing the user data includes a session unit and at least one of a bearer unit, a service flow unit, or a content unit. The session unit is configured to perform session processing, the bearer unit is configured to perform bearer processing, the service flow unit is configured to perform service flow processing, and the content unit is configured to perform content processing.

Optionally, the first request message includes service data information associated with the user data and service unit configuration information of the service unit, so that the GW-U saves the service data information and the service unit configuration information and saves an association relationship between the added service unit and the service data information and an association relationship between the added service unit and the service unit configuration information.

Alternatively, the first request message includes service data information associated with the user data and identifier information of the service unit configuration information of the service unit, so that the GW-U determines the service unit configuration information according to the identifier information of the service unit configuration information, saves the service data information and the determined service unit configuration information, and saves an association relationship between the added service unit and the service data information and an association relationship between the added service unit and the service unit configuration information.

The service data information includes an Internet Protocol IP address of a terminal to which the user data belongs, and at least one of tunnel information used to transmit the user data, IP 5-tuple information used to transmit the user data, or content information of the user data.

The service unit configuration information includes information about an operation performed by the service unit and information about a parameter used by the service unit when the service unit processes the user data.

Optionally, the first request message includes identifier information of the session unit configured to process the user data, the service unit configuration information of the service unit, and some items in the service data information, so that the GW-U adds the some items to the original service data information, saves an association relationship between the session unit configured to process the user data and the service unit, saves the service data information to which the some items have been added and the service unit configuration information, and saves an association relationship between the service data information and the service unit and an association relationship between the service unit configuration information and the service unit.

Alternatively, the first request message includes identifier information of the session unit configured to process the user data, identifier information of the service unit configuration information of the service unit, and some items in the service data information, so that the GW-U adds the some items to the original service data information, saves an association relationship between the session unit configured to process the user data and the service unit, determines the service unit configuration information according to the identifier information of service unit configuration information, saves the service data information to which the some items have been added and the service unit configuration information, and saves an association relationship between the service data information and the service unit and an association relationship between the service unit configuration information and the service unit.

The service data information includes an IP address of a terminal to which the user data belongs, and at least one of tunnel information used to transmit the user data, IP 5-tuple information used to transmit the user data, or content information of the user data. The some items include at least one of the tunnel information, the IP 5-tuple, or the application layer identifier.

The service unit configuration information includes information about an operation performed by the service unit and information about a parameter used by the service unit when the service unit processes the user data.

Optionally, if the service data information includes the tunnel information, the service unit includes a bearer unit.

If the service data information includes the IP 5-tuple information, the service unit includes a service flow unit.

If the service data information includes the content information, the service unit includes a content unit.

Optionally, the first request message further includes unit type information of the service unit, and the unit type information includes a type identifier of the service unit or an identifier of a template used by the service unit, so that the GW-U:

determines, according to the unit type information of the service unit, the service unit template used by the service unit, and adds the service unit based on the determined service unit template.

Optionally, the sending unit 2202 is further configured to: before sending the first request message to the GW-U, send a second request message to the GW-U, where the second request message is used to request to add the service unit template.

Optionally, the first request message further includes processing order information, and the processing order information is used to indicate a processing order of the service unit that processes the user data in the GW-U.

Optionally, the GW-U is a local access gateway, and the user data is uplink user data.

The service unit configuration information further includes user data forwarding information, and the user data forwarding information is used to indicate:

after the service unit configured to process the user data completes processing the user data, whether to send the processed user data to another GW-U used as a mobile anchor, or to forward the processed user data to a packet data network PDN.

Optionally, the user data forwarding information is determined according to a service type of the user data.

For another optional manner of the apparatus shown in FIG. 22, refer to the aforementioned GW-C 501.

In the apparatus shown in FIG. 22, the sending unit 2202 may be implemented by a transmitter, and the processing unit 2201 may be implemented by a processor. Optionally, the processor and the transmitter may be integrated into one or more chips for implementation.

Figure 23:
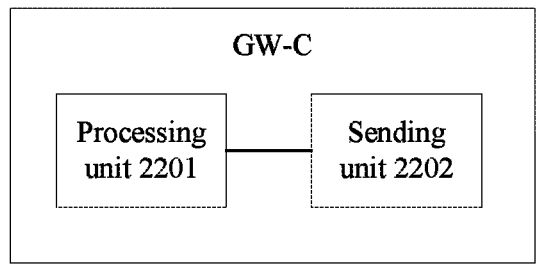
FIG. 23 is a schematic diagram of a GW-C according to an embodiment of the present disclosure.

FIG. 23 is a schematic diagram of a gateway control plane GW-C according to an embodiment of the present disclosure. As shown in FIG. 23, the GW-C includes the apparatus shown in FIG. 22. For another optional implementation of the GW-C, refer to the aforementioned GW-C 501.

Figure 24:
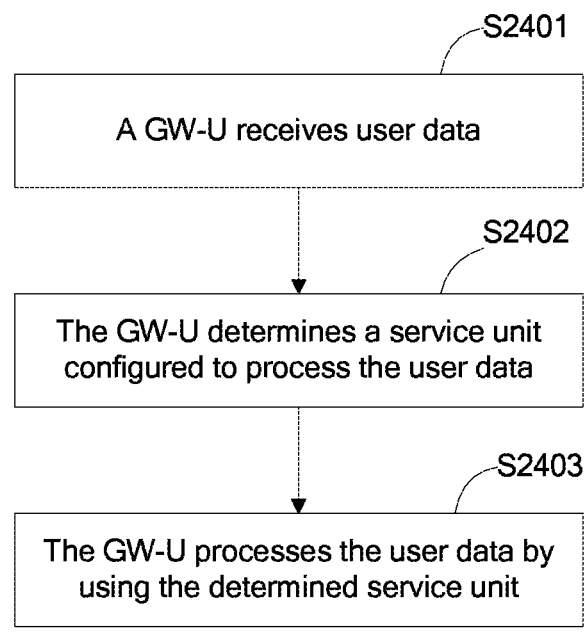
FIG. 24 is a flowchart of a user data processing method according to an embodiment of the present disclosure.

FIG. 24 is a flowchart of a user data processing method according to an embodiment of the present disclosure. As shown in FIG. 24, the method includes the following steps.

S2401: A gateway user plane GW-U receives user data, where the GW-U includes at least two service units configured to process the user data.

S2402: The GW-U determines a service unit configured to process the user data.

The service unit processing the user data includes a session unit and at least one of a bearer unit, a service flow unit, or a content unit. The session unit is configured to perform session processing, the bearer unit is configured to perform bearer processing, the service flow unit is configured to perform service flow processing, and the content unit is configured to perform content processing.

S2403: The GW-U processes the user data by using the determined service unit.

Optionally, the user data includes service data information, and the service data information is used to determine, in the GW-U, a service unit configured to process the user data.

That the GW-U determines a service unit configured to process the user data includes: The GW-U determines, according to the service data information, the service unit configured to process the user data.

Optionally, the service data information includes:

an Internet Protocol IP address of a terminal to which the user data belongs, and at least one of tunnel information used to transmit the user data, IP 5-tuple information used to transmit the user data, or content information of the user data.

Optionally, that the GW-U determines, according to the service data information, the service unit configured to process the user data includes: The GW-U uses a session unit associated with the IP address of the terminal to which the user data belongs, as the session unit configured to process the user data.

If the service data information includes the tunnel information, the GW-U uses a bearer unit associated with the tunnel information, as the bearer unit configured to process the user data. If the service data information includes the IP 5-tuple information, the GW-U uses a service flow unit associated with the IP 5-tuple information, as the service flow unit configured to process the user data. If the service data information includes the content information, the GW-U uses a content unit associated with the content information, as the content unit configured to process the user data.

That the GW-U processes the user data by using the determined service unit includes:

the session unit processes the user data, and sends the processed user data to another determined service unit configured to process the user data; and the another service unit processes the user data received from the session unit.

Optionally, that the GW-U processes the user data by using the determined service unit includes:

the determined service unit processes the user data according to saved service unit configuration information of the service unit.

The service unit configuration information includes information about an operation performed by the determined service unit and information about a parameter used by the determined service unit when the determined service unit processes the user data.

Optionally, before the GW-U processes the user data by using the determined service unit, the method further includes:

receiving a first request message sent by a gateway control plane GW-C, where the first request message is used to add the service unit, and the first request message includes the service data information and the service unit configuration information; adding the service unit, saving the service data information and the service unit configuration information, saving an association relationship between the added service unit and the service data information, and saving an association relationship between the added service unit and the service unit configuration information; or receiving a first request message sent by a gateway control plane GW-C, where the first request message is used to add the service unit, and the first request message includes the service data information and identifier information of the service unit configuration information; adding the service unit, determining the service unit configuration information according to the identifier information of the service unit configuration information, saving the service data information and the determined service unit configuration information, saving an association relationship between the added service unit and the service data information, and saving an association relationship between the added service unit and the service unit configuration information.

Optionally, before the GW-U processes the user data by using the determined service unit, the method further includes:

receiving a first request message sent by a gateway control plane GW-C, where the first request message is used to add the service unit associated with the session unit configured to process the user data, the first request message includes identifier information of the session unit configured to process the user data, the service unit configuration information of the service unit, and some items in the service data information, and the some items include at least one of the tunnel information, the IP 5-tuple, or the application layer identifier; adding the service unit, adding the some items to the original service data information, saving an association relationship between the session unit configured to process the user data and the service unit, saving the service data information to which the some items have been added and the service unit configuration information, saving an association relationship between the added service unit and the service data information, and saving an association relationship between the added service unit and the service unit configuration information; or receiving a first request message sent by a gateway control plane GW-C, where the first request message is used to add the service unit associated with the session unit configured to process the user data, the first request message includes identifier information of the session unit configured to process the user data, identifier information of the service unit configuration information of the service unit, and some items in the service data information, and the some items include at least one of the tunnel information, the IP 5-tuple, or the application layer identifier; adding the service unit, determining the service unit configuration information according to the identifier information of the service unit configuration information, adding the some items to the original service data information, saving an association relationship between the session unit configured to process the user data and the service unit, saving the service data information to which the some items have been added and the determined service unit configuration information, saving an association relationship between the added service unit and the service data information, and saving an association relationship between the added service unit and the service unit configuration information.

Optionally, the first request message further includes unit type information of the service unit, and the unit type information includes a type identifier of the service unit or an identifier of a template used by the service unit.

The adding the service unit includes:

determining, according to the unit type information of the service unit, the service unit template used by the service unit, and adding the service unit based on the determined service unit template.

Optionally, before the adding the service unit based on the determined service unit template, the method further includes:

receiving a second request message sent by the GW-C, where the second request message is used to request to add the service unit template; and adding the service unit template after receiving the second request message.

Optionally, the first request message further includes processing order information, and the processing order information is used to indicate a processing order of the service unit that processes the user data.

That the GW-U processes the user data by using the determined service unit includes:

the session unit configured to process the user data processes the user data; and the session unit configured to process the user data sends the user data and the processing order information to a next-hop service unit indicated by the processing order, according to the processing order indicated by the processing order information, so that a subsequent service unit including the next-hop service unit processes the user data in the processing order.

Optionally, the GW-U is a local access gateway, and the user data is uplink user data.

The service unit configuration information further includes user data forwarding information, and the user data forwarding information is used to indicate:

after the service unit configured to process the user data completes processing the user data, whether to send the processed user data to another GW-U used as a mobile anchor, or to forward the processed user data to a packet data network PDN.

Optionally, the user data forwarding information is determined according to a service type of the user data.

Optionally, the GW-U is a mobile anchor, or the GW-U is a local access gateway.

Optionally, the adding the service unit includes: adding the service unit by creating a service context.

That the GW-U processes the user data by using the determined service unit includes: The GW-U processes the user data by using the service context used when creating the service unit.

If the service unit is a session unit, the service context is a session context.

If the service unit is a bearer unit, the service context is a bearer context.

If the service unit is a service flow unit, the service context is a service flow context.

If the service unit is a content unit, the service context is a content context.

For another optional implementation of the method shown in FIG. 24, refer to the aforementioned processing by the GW-U 502.

An embodiment of the present disclosure further provides a computer readable medium, including:

computer programming code, where the computer programming code enables, when being executed by a computer unit, the computer unit to execute the method shown in FIG. 24.

Figure 25:
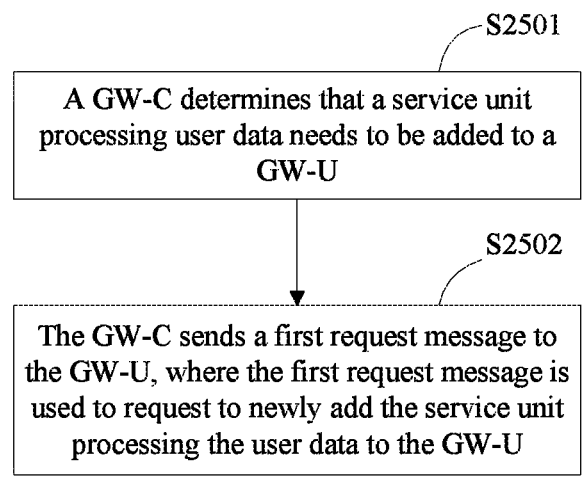
FIG. 25 is a flowchart of a gateway configuration method according to an embodiment of the present disclosure.

FIG. 25 is a flowchart of a gateway configuration method according to an embodiment of the present disclosure. As shown in FIG. 25, the method includes the following steps.

S2501: A gateway control plane GW-C determines that a service unit processing user data needs to be added to a gateway user plane GW-U.

S2502: The GW-C sends a first request message to the GW-U, where the first request message is used to request to add the service unit processing the user data to the GW-U.

The service unit processing the user data includes a session unit and at least one of a bearer unit, a service flow unit, or a content unit. The session unit is configured to perform session processing, the bearer unit is configured to perform bearer processing, the service flow unit is configured to perform service flow processing, and the content unit is configured to perform content processing.

Optionally, the first request message includes service data information associated with the user data and service unit configuration information of the service unit, so that the GW-U saves the service data information and the service unit configuration information and saves an association relationship between the added service unit and the service data information and an association relationship between the added service unit and the service unit configuration information.

Alternatively, the first request message includes service data information associated with the user data and identifier information of the service unit configuration information of the service unit, so that the GW-U determines the service unit configuration information according to the identifier information of the service unit configuration information, saves the service data information and the determined service unit configuration information, and saves an association relationship between the added service unit and the service data information and an association relationship between the added service unit and the service unit configuration information.

The service data information includes an Internet Protocol IP address of a terminal to which the user data belongs, and at least one of tunnel information used to transmit the user data, IP 5-tuple information used to transmit the user data, or content information of the user data.

The service unit configuration information includes information about an operation performed by the service unit and information about a parameter used by the service unit when the service unit processes the user data.

Optionally, the first request message includes identifier information of the session unit configured to process the user data, the service unit configuration information of the service unit, and some items in the service data information, so that the GW-U adds the some items to the original service data information, saves an association relationship between the session unit configured to process the user data and the service unit, saves the service data information to which the some items have been added and the service unit configuration information, and saves an association relationship between the service data information and the service unit and an association relationship between the service unit configuration information and the service unit.

Alternatively, the first request message includes identifier information of the session unit configured to process the user data, identifier information of the service unit configuration information of the service unit, and some items in the service data information, so that the GW-U adds the some items to the original service data information, saves an association relationship between the session unit configured to process the user data and the service unit, determines the service unit configuration information according to the identifier information of service unit configuration information, saves the service data information to which the some items have been added and the service unit configuration information, and saves an association relationship between the service data information and the service unit and an association relationship between the service unit configuration information and the service unit.

The service data information includes an IP address of a terminal to which the user data belongs, and at least one of tunnel information used to transmit the user data, IP 5-tuple information used to transmit the user data, or content information of the user data. The some items include at least one of the tunnel information, the IP 5-tuple, or the application layer identifier.

The service unit configuration information includes information about an operation performed by the service unit and information about a parameter used by the service unit when the service unit processes the user data.

Optionally, if the service data information includes the tunnel information, the service unit includes a bearer unit.

If the service data information includes the IP 5-tuple information, the service unit includes a service flow unit.

If the service data information includes the content information, the service unit includes a content unit.

Optionally, the first request message further includes unit type information of the service unit, and the unit type information includes a type identifier of the service unit or an identifier of a template used by the service unit, so that the GW-U:

determines, according to the unit type information of the service unit, the service unit template used by the service unit, and adds the service unit based on the determined service unit template.

Optionally, before the GW-C sends the first request message to the GW-U, the method further includes:

sending, by the GW-C, a second request message to the GW-U, where the second request message is used to request to add the service unit template.

Optionally, the first request message further includes processing order information, and the processing order information is used to indicate a processing order of the service unit that processes the user data in the GW-U.

Optionally, the GW-U is a local access gateway, and the user data is uplink user data.

The service unit configuration information further includes user data forwarding information, and the user data forwarding information is used to indicate:

after the service unit configured to process the user data completes processing the user data, whether to send the processed user data to another GW-U used as a mobile anchor, or to forward the processed user data to a packet data network PDN.

Optionally, the user data forwarding information is determined according to a service type of the user data.

For another optional implementation of the method shown in FIG. 25, refer to the aforementioned processing by the GW-C 501.

An embodiment of the present disclosure further provides a computer readable medium, including:

computer programming code, where the computer programming code enables, when being executed by a computer unit, the computer unit to execute the method shown in FIG. 25.

To sum up, in the embodiments of the present disclosure, after receiving the user data, the GW-U determines the service unit configured to process the user data, and processes the user data by using the service unit determined by the GW-U, improving processing flexibility of the GW-U.

Further, the GW-C performs a configuration operation, such as adding, modification, or deletion, on the service unit in the GW-U, so that service units in the GW-U can be flexibly combined. Different from that in an existing network, this can avoid frequently changing the GW-U, and the GW-U does not always need to be modified each time service function logic is added. In this way, user data can be flexibly processed according to a service requirement of the user data. For example, a service unit can be flexibly added or removed in a process of processing the user data, so that the GW-U is able to adapt to a future new service type of user data.

After the GW-U completes configuring the GW-U, the GW-U can independently process the user data without interacting with the GW-C. This decreases coupling between the GW-U and the GW-C and reduces signaling overheads, and also decreases coupling between service units in the GW-U.

Further, the GW-C may further configure the template of the service unit in the GW-U, so that a service unit can be modified or added to the GW-U based on the existing template. This reduces signaling exchange between the GW-C and the GW-U.

Further, when configuring the service unit, the GW-C may deliver, to the GW-U, processing order information of each service unit that is configured to process the user data. When the GW-U internally processes the user data, the processing order information and the user data may be transmitted between the service units, instead of being returned to the interface management unit to reallocate a service unit to process the user data.

Further, when configuring the service unit in the GW-U, the GW-C adds the user data forwarding information to the service unit configuration information, and configures the service unit configuration information for the service unit, to instruct the service unit to send the processed user data to the another GW-U used as a mobile anchor, or to forward the processed user data to the PDN. In this way, user data that does not need to be processed by the mobile anchor directly enters the PDN. This reduces processing load of the mobile anchor and reduces a delay of transmitting the user data.

Further, whether the user data is processed by the mobile anchor may be determined according to the service type of the user data. User data that ensures service continuity is sent to the mobile anchor for processing, so as to ensure service continuity when the terminal moves.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Obviously, persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A user data processing apparatus, comprising:
a memory; and
a processor coupled to the memory, the processor including at least two service partitions and configured to:
receive user data; and
process the user data, wherein
the at least two service partitions include a session partition and at least one of a bearer partition, a service flow partition, or a content partition; the session partition is configured to perform session processing, the bearer partition is configured to perform bearer processing, the service flow partition is configured to perform service flow processing, and the content partition is configured to perform content processing;
the processor is further configured to determine the session partition configured to process the user data, and send the received user data to the determined session partition; and
the session partition is further configured to determine another service partition configured to process the user data.

2. The apparatus according to claim 1, wherein
the user data comprises service data information, wherein the service data information is used to determine a service partition configured to process the user data;
the processor is configured to determine, according to the service data information, the session partition configured to process the user data; and
the session partition is configured to determine, according to the service data information, the another service partition configured to process the user data.

3. The apparatus according to claim 2, wherein the service data information includes:
an Internet Protocol IP address of a terminal to which the user data belongs, and
at least one of tunnel information used to transmit the user data, IP 5-tuple information used to transmit the user data, or content information of the user data.

4. The apparatus according to claim 3, wherein
the processor is configured to use a session partition associated with the IP address of the terminal to which the user data belongs, as the session partition configured to process the user data; and
the session partition is configured to:
if the service data information includes the tunnel information, use a bearer partition associated with the tunnel information as the another service partition configured to process the user data; if the service data information includes the IP 5-tuple information, use a service flow partition associated with the IP 5-tuple information as the another service partition configured to process the user data; or if the service data information includes the content information, use a content partition associated with the content information as the another service partition configured to process the user data.

5. The apparatus according to claim 2, wherein
the service partition is configured to process the user data according to saved service partition configuration information, wherein
the service partition configuration information comprises information about an operation performed by the service partition and information about a parameter used by the service partition when the service partition processes the user data.

6. The apparatus according to claim 5, wherein
the receiver is further configured to: receive a first request message sent by a gateway control plane (GW-C), wherein the first request message is used to add the service partition, and the first request message includes the service data information and the service partition configuration information; the processor is configured to add the service partition, save the service data information and the service partition configuration information, save an association relationship between the added service partition and the service data information, and save an association relationship between the added service partition and the service partition configuration information; or
the receiver is further configured to receive a first request message sent by a GW-C, wherein the first request message is used to add the service partition, and the first request message includes the service data information and identifier information of the service partition configuration information; the processor is configured to add the service partition, determine the service partition configuration information according to the identifier information of the service partition configuration information, save the service data information and the determined service partition configuration information, save an association relationship between the added service partition and the service data information, and save an association relationship between the added service partition and the service partition configuration information; or
the receiver is further configured to receive a first request message sent by a GW-C, wherein the first request message is used to add the service partition associated with the session partition configured to process the user data, the first request message includes identifier information of the session partition configured to process the user data, the service partition configuration information of the service partition, and some items in the service data information, and the some items include at least one of the tunnel information, the IP 5-tuple, or the application layer identifier; the processor is configured to add the service partition, add the some items to the original service data information, save an association relationship between the session partition configured to process the user data and the service partition, save the service data information to which the some items have been added and the service partition configuration information, save an association relationship between the added service partition and the service data information, and save an association relationship between the added service partition and the service partition configuration information; or
the receiver is further configured to receive a first request message sent by a GW-C, wherein the first request message is used to add the service partition associated with the session partition configured to process the user data, the first request message includes identifier information of the session partition configured to process the user data, identifier information of the service partition configuration information of the service partition, and some items in the service data information, and the some items include at least one of the tunnel information, the IP 5-tuple, or the application layer identifier; the processor is configured to add the service partition, determine the service partition configuration information according to the identifier information of the service partition configuration information, add the some items to the original service data information, save an association relationship between the session partition configured to process the user data and the service partition, save the service data information to which the some items have been added and the determined service partition configuration information, save an association relationship between the added service partition and the service data information, and save an association relationship between the added service partition and the service partition configuration information.

7. The apparatus according to claim 6, wherein the first request message includes partition type information of the service partition, and the partition type information includes a type identifier of the service partition or an identifier of a template used by the service partition; and
the processor is configured to:
determine, according to the partition type information of the service partition, the service partition template used by the service partition, and add the service partition based on the determined service partition template.

8. The apparatus according to claim 6, wherein the first request message includes processing order information, and the processing order information is used to indicate a processing order of the service partition that processes the user data; and
the session partition is further configured to: after the user data is processed, send the user data and the processing order information to a next-hop service partition indicated by the processing order.

9. The apparatus according to claim 6, wherein the apparatus is a local access gateway, and the user data is uplink user data; and
the service partition configuration information includes user data forwarding information, wherein the user data forwarding information is used to indicate:
after the service partition configured to process the user data completes processing the user data, whether to send the processed user data to a gateway user plane (GW-U) used as a mobile anchor, or to forward the processed user data to a packet data network (PDN).

10. The apparatus according to claim 1, wherein
a GW-U in which the apparatus is located is a mobile anchor; or
a gateway user plane GW-U in which the apparatus is located is a local access gateway.

11. A user data processing method, comprising:
receiving, by a gateway user plane (GW-U), user data;
determining, by the GW-U, a service partition of a processor configured to process the user data, wherein
the service partition comprises a session partition and at least one of a bearer partition, a service flow partition, or a content partition; the session partition is configured to perform session processing, the bearer partition is configured to perform bearer processing, the service flow partition is configured to perform service flow processing, and the content partition is configured to perform content processing; and
processing, by the GW-U, the user data by using the determined service partition.

12. The method according to claim 11, wherein
the user data includes service data information, wherein the service data information is used to determine a service partition that is in the GW-U and that is configured to process the user data; and
determining the service partition comprises: determining, by the GW-U according to the service data information, the service partition configured to process the user data.

13. The method according to claim 12, wherein the service data information includes:
an Internet Protocol IP address of a terminal to which the user data belongs, and at least one of tunnel information used to transmit the user data, IP 5-tuple information used to transmit the user data, or content information of the user data.

14. The method according to claim 13, wherein
determining the service partition comprises: using, by the GW-U, a session partition associated with the IP address of the terminal to which the user data belongs, as the session partition configured to process the user data; and
if the service data information includes the tunnel information, using, by the GW-U, a bearer partition associated with the tunnel information, as the service partition configured to process the user data; if the service data information includes the IP 5-tuple information, using, by the GW-U, a service flow partition associated with the IP 5-tuple information, as the service partition configured to process the user data; or if the service data information includes the content information, using, by the GW-U, a content partition associated with the content information, as the service partition configured to process the user data; and
processing the user data comprises:
processing, by the session partition, the user data, and sending the processed user data to another determined service partition configured to process the user data; and
processing, by the another service partition, the user data received from the session partition.

15. The method according to claim 12, wherein processing the user data comprises:
processing, by the determined service partition, the user data according to saved service partition configuration information of the service partition, wherein
the service partition configuration information includes information about an operation performed by the determined service partition and information about a parameter used by the determined service partition when the determined service partition processes the user data.

16. The method according to claim 15, further comprising:
receiving a first request message sent by a gateway control plane (GW-C), wherein the first request message is used to add the service partition, and the first request message includes the service data information and the service partition configuration information; adding the service partition, saving the service data information and the service partition configuration information, saving an association relationship between the added service partition and the service data information, and saving an association relationship between the added service partition and the service partition configuration information; or
receiving a first request message sent by a GW-C, wherein the first request message is used to add the service partition, and the first request message includes the service data information and identifier information of the service partition configuration information; adding the service partition, determining the service partition configuration information according to the identifier information of the service partition configuration information, saving the service data information and the determined service partition configuration information, saving an association relationship between the added service partition and the service data information, and saving an association relationship between the added service partition and the service partition configuration information; or receiving a first request message sent by a GW-C, wherein the first request message is used to add the service partition associated with the session partition configured to process the user data, the first request message includes identifier information of the session partition configured to process the user data, the service partition configuration information of the service partition, and some items in the service data information, and the some items include at least one of the tunnel information, the IP 5-tuple, or the application layer identifier; adding the service partition, adding the some items to the original service data information, saving an association relationship between the session partition configured to process the user data and the service partition, saving the service data information to which the some items have been added and the service partition configuration information, saving an association relationship between the added service partition and the service data information, and saving an association relationship between the added service partition and the service partition configuration information; or receiving a first request message sent by a GW-C, wherein the first request message is used to add the service partition associated with the session partition configured to process the user data, the first request message includes identifier information of the session partition configured to process the user data, identifier information of the service partition configuration information of the service partition, and some items in the service data information, and the some items include at least one of the tunnel information, the IP 5-tuple, or the application layer identifier; adding the service partition, determining the service partition configuration information according to the identifier information of the service partition configuration information, adding the some items to the original service data information, saving an association relationship between the session partition configured to process the user data and the service partition, saving the service data information to which the some items have been added and the determined service partition configuration information, saving an association relationship between the added service partition and the service data information, and saving an association relationship between the added service partition and the service partition configuration information.

17. The method according to claim 16, wherein the first request message includes partition type information of the service partition, and the partition type information includes a type identifier of the service partition or an identifier of a template used by the service partition; and adding the service partition comprises:
determining, according to the partition type information of the service partition, the service partition template used by the service partition, and adding the service partition based on the determined service partition template.

18. The method according to claim 16, wherein the first request message includes processing order information, and the processing order information is used to indicate a processing order of the service partition that processes the user data; and processing the user data comprises:
processing, by the session partition configured to process the user data, the user data; and
sending, by the session partition configured to process the user data, the user data and the processing order information to a next-hop service partition indicated by the processing order.

19. The method according to claim 16, wherein the GW-U is a local access gateway, and the user data is uplink user data; and the service partition configuration information includes user data forwarding information, wherein the user data forwarding information is used to indicate:
after the service partition configured to process the user data completes processing the user data, whether to send the processed user data to another GW-U used as a mobile anchor, or to forward the processed user data to a packet data network (PDN).

20. A non-transitory computer readable medium, comprising computer programming code including instructions, wherein the instructions enable, when being executed by a computer, the computer to execute the method comprising:

receiving user data;
determining a service partition of a processor configured to process the user data, wherein
the service partition includes a session partition and at least one of a bearer partition, a service flow partition, or a content partition; the session partition is configured to perform session processing, the bearer partition is configured to perform bearer processing, the service flow partition is configured to perform service flow processing, and the content partition is configured to perform content processing; and
processing the user data by using the determined service partition.

* * * * *